US012610357B2

(12) United States Patent
Hosseini et al.

(10) Patent No.: US 12,610,357 B2
(45) Date of Patent: Apr. 21, 2026

(54) DOWNLINK TRIGGERED CHANNEL STATE INFORMATION REPORTING FOR SEMI-PERSISTENT SCHEDULING

(71) Applicant: QUALCOMM Incorporated, San Diego, CA (US)

(72) Inventors: Seyedkianoush Hosseini, San Diego, CA (US); Yi Huang, San Diego, CA (US); Wei Yang, San Diego, CA (US); Wanshi Chen, San Diego, CA (US); Krishna Kiran Mukkavilli, San Diego, CA (US); Yu Zhang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 690 days.

(21) Appl. No.: 17/904,182

(22) PCT Filed: Feb. 14, 2020

(86) PCT No.: PCT/CN2020/075261
§ 371 (c)(1),
(2) Date: Aug. 12, 2022

(87) PCT Pub. No.: WO2021/159465
PCT Pub. Date: Aug. 19, 2021

(65) Prior Publication Data
US 2023/0113127 A1     Apr. 13, 2023

(51) Int. Cl.
*H04W 72/11*          (2023.01)
*H04B 7/06*           (2006.01)
(Continued)

(52) U.S. Cl.
CPC .......... *H04W 72/11* (2023.01); *H04B 7/0626* (2013.01); *H04L 1/0026* (2013.01); *H04W 24/10* (2013.01); *H04W 72/23* (2023.01)

(58) Field of Classification Search
None
See application file for complete search history.

(56) References Cited

U.S. PATENT DOCUMENTS

2011/0249578 A1* 10/2011 Nayeb Nazar ........ H04L 5/0053
                                                370/252
2019/0028242 A1    1/2019 Xiao et al.
                          (Continued)

FOREIGN PATENT DOCUMENTS

CN          102781111 A      11/2012
CN          110771073 A       2/2020
                (Continued)

OTHER PUBLICATIONS

Supplementary European Search Report—EP20918386—Search Authority—The Hague—Oct. 11, 2023 (201991EP).
(Continued)

*Primary Examiner* — Otis L Thompson, Jr.
(74) *Attorney, Agent, or Firm* — Holland & Hart LLP/Qualcomm

(57)          ABSTRACT

Methods, systems, and devices for wireless communications are described. A user equipment (UE) may determine a channel state reporting configuration for one or more semi-persistent scheduling (SPS) configurations for communications with a base station. For example, different channel state report configurations may be configured for the UE within the SPS configuration. Additionally, a downlink control information (DCI) associated with the SPS configuration may be used to activate the channel state report configuration. In some cases, different channel state report configurations may be configured for an SPS configuration, and the DCI may include a bit field to indicate which configured channel state report configuration is activated for the SPS configuration. Additionally, if the DCI indicates a release for (Continued)

an SPS configuration, the UE may refrain from transmitting channel state reports with an acknowledgment feedback acknowledging the release.

26 Claims, 17 Drawing Sheets

(51) Int. Cl.

| | | |
|---|---|---|
| *H04L 1/00* | (2006.01) | |
| *H04W 24/10* | (2009.01) | |
| *H04W 72/23* | (2023.01) | |

(56) References Cited

U.S. PATENT DOCUMENTS

| | | | | |
|---|---|---|---|---|
| 2019/0116608 A1 | 4/2019 | Kim et al. | | |
| 2019/0123801 A1* | 4/2019 | Yum | ...................... | H04L 5/0064 |
| 2019/0149305 A1* | 5/2019 | Zhou | ...................... | H04L 5/0092 |
| | | | | 370/330 |
| 2019/0149379 A1* | 5/2019 | Xiong | ...................... | H04L 5/006 |
| | | | | 370/329 |
| 2019/0174466 A1* | 6/2019 | Zhang | ................... | H04L 5/0057 |
| 2019/0207662 A1* | 7/2019 | Zhou | ................. | H04W 72/0453 |
| 2019/0208436 A1* | 7/2019 | Zhou | ................... | H04B 17/309 |
| 2019/0215781 A1* | 7/2019 | Jeon | .................... | H04W 52/365 |
| 2019/0222349 A1 | 7/2019 | Gao et al. | | |
| 2019/0261354 A1 | 8/2019 | Fakoorian et al. | | |
| 2019/0356452 A1 | 11/2019 | Yokomakura et al. | | |
| 2020/0228212 A1* | 7/2020 | Xu | ...................... | H04L 27/2602 |
| 2020/0280996 A1* | 9/2020 | Yang | .................... | H04B 7/0626 |
| 2021/0007126 A1* | 1/2021 | Su | ........................... | H04L 1/18 |
| 2022/0007399 A1* | 1/2022 | Rastegardoost | ...... | H04L 5/0073 |
| 2022/0346086 A1* | 10/2022 | Aiba | .................... | H04L 5/0094 |
| 2023/0097142 A1* | 3/2023 | Alfarhan | ............. | H04B 17/318 |
| | | | | 370/329 |
| 2024/0430900 A1* | 12/2024 | El Hamss | ............. | H04L 1/1864 |

FOREIGN PATENT DOCUMENTS

| | | |
|---|---|---|
| WO | WO-2015018040 A1 | 2/2015 |
| WO | WO-2019028857 A1 | 2/2019 |
| WO | 2019213921 A1 | 11/2019 |
| WO | WO-2021163162 A1 | 8/2021 |

OTHER PUBLICATIONS

Huawei, et al., "Independent and Joint Control of CSI-RS Transmission and CSI Reporting for NR MIMO", R1-1701681, 3GPP TSG RAN WG1 # 88 Meeting, Feb. 17, 2017 (Feb. 17, 2017), 7 pages, the whole document.

International Search Report and Written Opinion—PCT/CN2020/075261—ISA/EPO—Nov. 18, 2020 (201991WO1).

Nokia: "Introduction of Cross-Carrier Scheduling with Different Numerologies", R1-1913667, 3GPP TSG-RAN WG1 Meeting #99, Nov. 22, 2019 (Nov. 22, 2019), 13 pages, the whole document.

* cited by examiner 105-b 115-b

405 — SPS Configuration(s)

410 — DCI Activating SPS Configuration(s)

Determine Channel
State Report
Configuration — 415

420 — Downlink Shared Channel

Determine
Acknowledgment
Feedback — 425

Acknowledgment Feedback

430

Channel State Report

435

440 — SPS Configuration Release Message

400

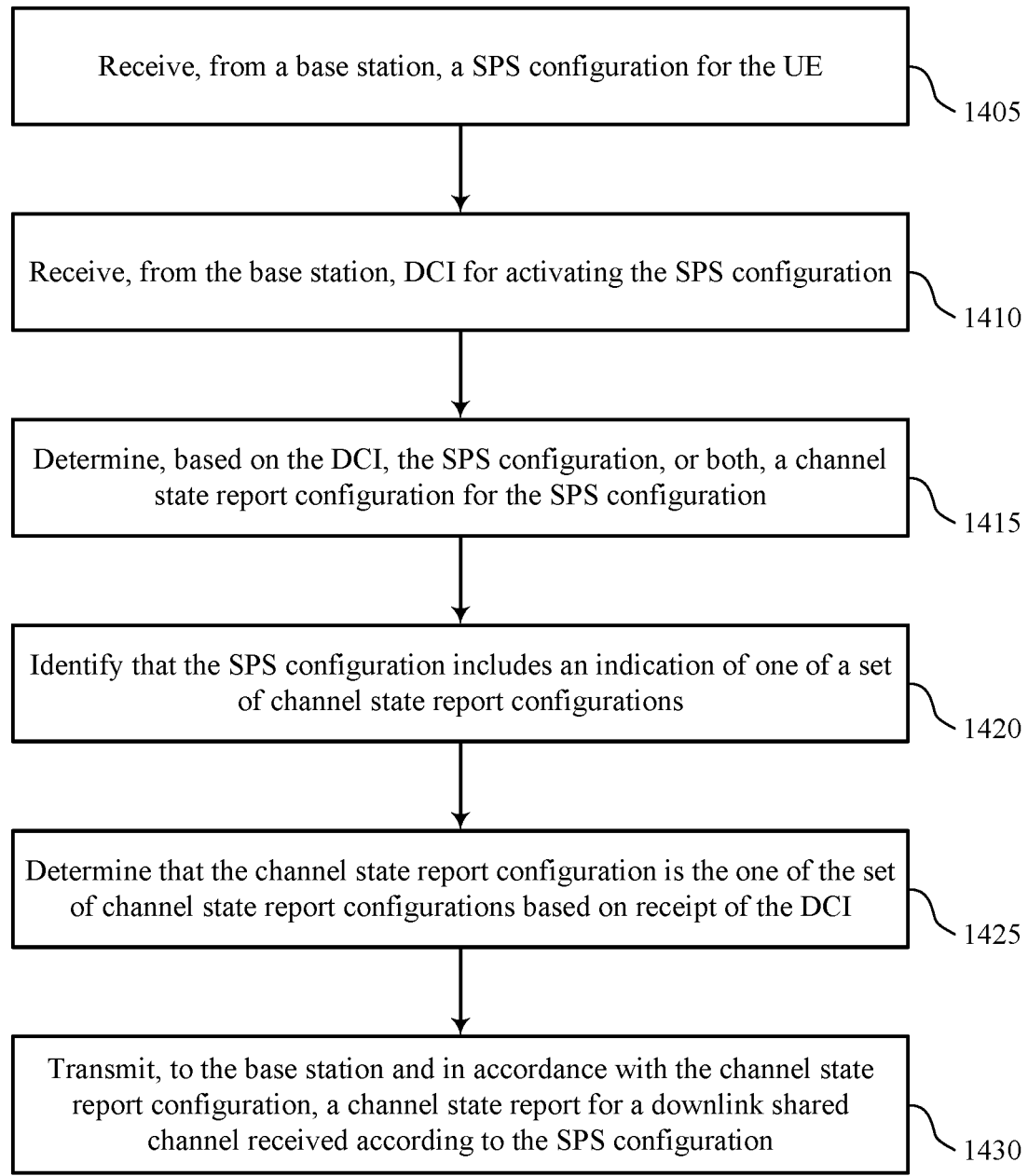

Receive, from a base station, a SPS configuration for the UE — 1405

Receive, from the base station, DCI for activating the SPS configuration — 1410

Determine, based on the DCI, the SPS configuration, or both, a channel state report configuration for the SPS configuration — 1415

Identify that the SPS configuration includes an indication of one of a set of channel state report configurations — 1420

Determine that the channel state report configuration is the one of the set of channel state report configurations based on receipt of the DCI — 1425

Transmit, to the base station and in accordance with the channel state report configuration, a channel state report for a downlink shared channel received according to the SPS configuration — 1430

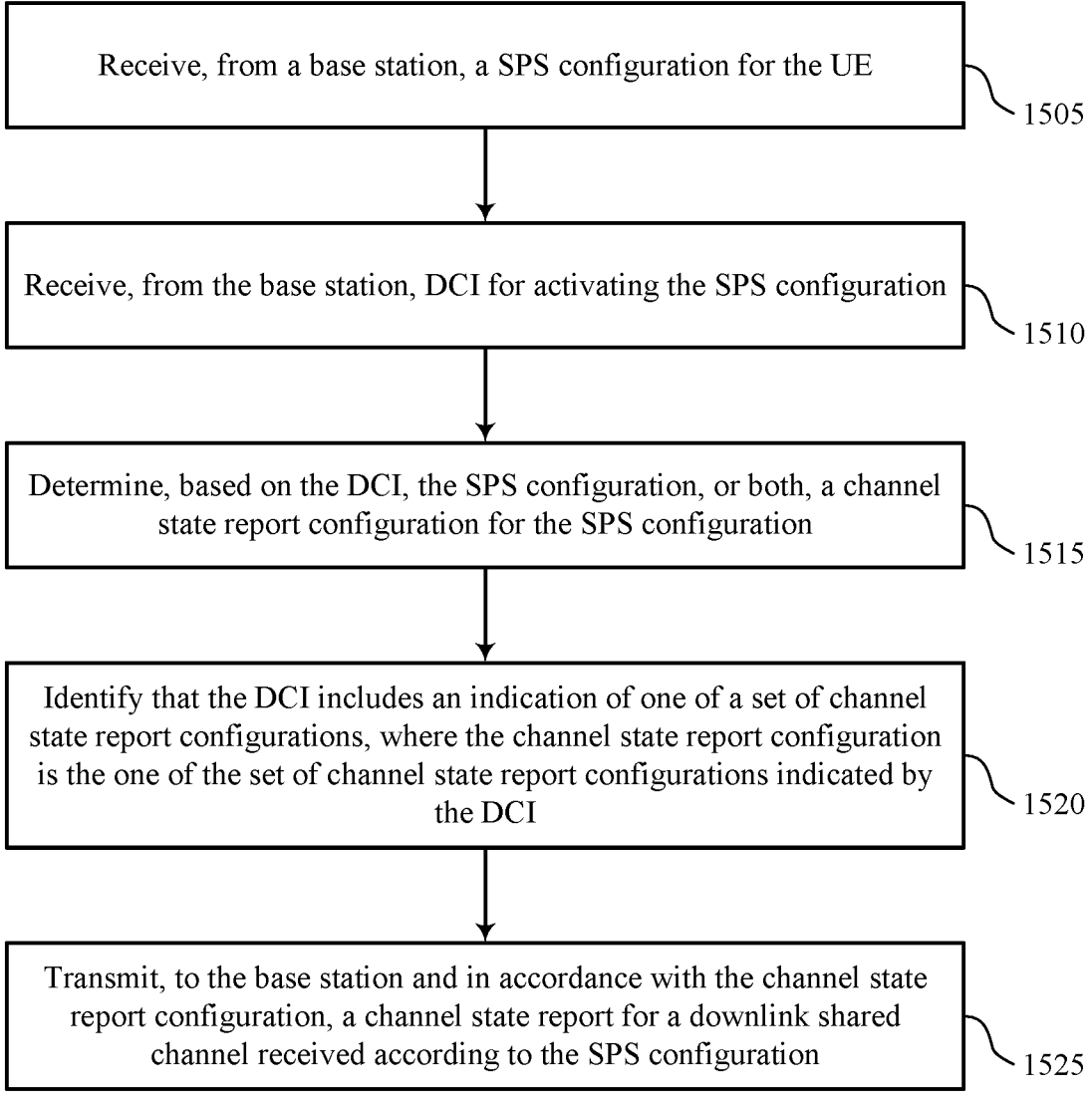

Receive, from a base station, a SPS configuration for the UE

1505

Receive, from the base station, DCI for activating the SPS configuration

1510

Determine, based on the DCI, the SPS configuration, or both, a channel state report configuration for the SPS configuration

1515

Identify that the DCI includes an indication of one of a set of channel state report configurations, where the channel state report configuration is the one of the set of channel state report configurations indicated by the DCI

1520

Transmit, to the base station and in accordance with the channel state report configuration, a channel state report for a downlink shared channel received according to the SPS configuration

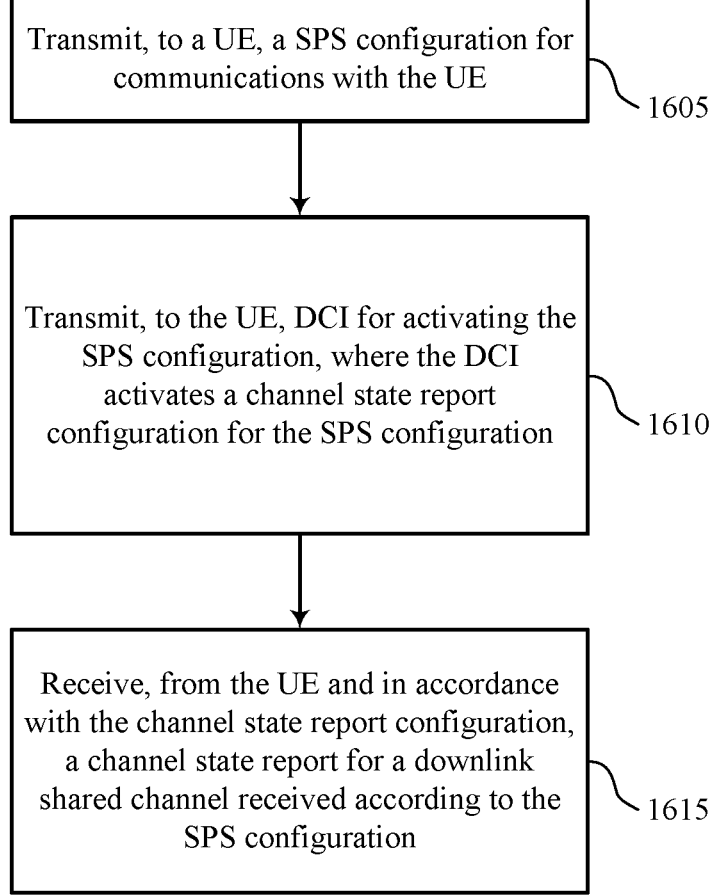

Transmit, to a UE, a SPS configuration for communications with the UE

1605

Transmit, to the UE, DCI for activating the SPS configuration, where the DCI activates a channel state report configuration for the SPS configuration

1610

Receive, from the UE and in accordance with the channel state report configuration, a channel state report for a downlink shared channel received according to the SPS configuration

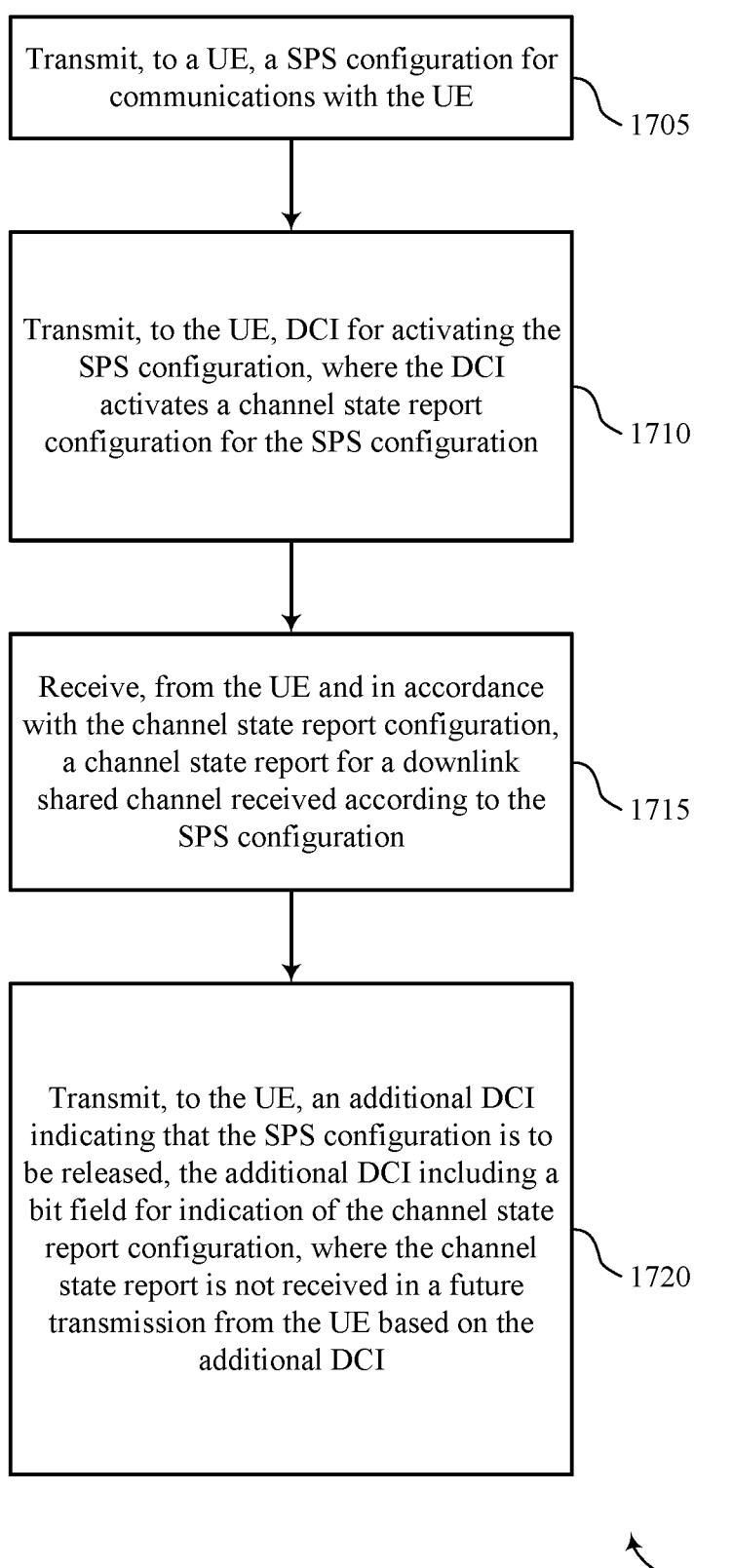

Transmit, to a UE, a SPS configuration for communications with the UE

1705

Transmit, to the UE, DCI for activating the SPS configuration, where the DCI activates a channel state report configuration for the SPS configuration

1710

Receive, from the UE and in accordance with the channel state report configuration, a channel state report for a downlink shared channel received according to the SPS configuration

1715

Transmit, to the UE, an additional DCI indicating that the SPS configuration is to be released, the additional DCI including a bit field for indication of the channel state report configuration, where the channel state report is not received in a future transmission from the UE based on the additional DCI

DOWNLINK TRIGGERED CHANNEL STATE INFORMATION REPORTING FOR SEMI-PERSISTENT SCHEDULING

CROSS REFERENCE

The present Application is a 371 national stage filing of International PCT Application No. PCT/CN2020/075261 by HOSSEINI et al. entitled "DOWNLINK TRIGGERED CHANNEL STATE INFORMATION REPORTING FOR SEMI-PERSISTENT SCHEDULING," filed Feb. 14, 2020, which is assigned to the assignee hereof, and which is expressly incorporated by reference in its entirety herein.

FIELD OF TECHNOLOGY

The following relates generally to wireless communications and more specifically to downlink triggered channel state information (CSI) reporting for semi-persistent scheduling (SPS).

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

In some wireless communications systems, communications between a base station and a UE may be transmitted according to an SPS configuration. For example, the SPS configuration may include periodic downlink messages transmitted by the base station on a downlink channel every 'X' slots (e.g., every slot, every second slot, every fourth slot, etc.). Subsequently, after receiving a periodic downlink message, the UE may transmit (e.g., on time-frequency resources configured by the base station, such as in a next occurring slot, two slots later, etc.) acknowledgment feedback on an uplink channel, where the acknowledgment feedback indicates whether the UE received and decoded the periodic downlink message successfully or not. Efficient techniques are desired for transmitting the acknowledgment feedback for periodic downlink messages received according to the SPS configuration.

SUMMARY

The described techniques relate to improved methods, systems, devices, and apparatuses that support downlink triggered channel state information (CSI) reporting for semi-persistent scheduling (SPS). Generally, the described techniques provide for a user equipment (UE) to receive an SPS configuration from a base station to receive subsequent periodic downlink traffic from the base station. In some cases, the UE may then receive an activation downlink control information (DCI) for activating the SPS configuration. Subsequently, based on the SPS configuration, the activation DCI, or both, the UE may determine a channel state report (e.g., a channel state information (CSI) or channel quality indication (CQI) report) configuration for the SPS configuration and may transmit a channel state report to the base station in accordance with the channel state report configuration, where the channel state report includes information about a downlink channel received from the base station as part of the SPS configuration.

In some cases, the UE may determine the channel state report configuration from an indication in the SPS configuration of a channel state report for the UE to transmit for that SPS configuration. Additionally or alternatively, the UE may determine the channel state report configuration from an indication in the activation DCI of a channel state report for the UE to transmit for the activated SPS configuration. The channel state report configurations may include different types for the UE to transmit the channel state report with acknowledgment feedback for the downlink channel regardless if the acknowledgment feedback is positive (e.g., a positive acknowledgment (ACK) feedback message) or negative (e.g., a negative acknowledgment (NACK) feedback message) or for the UE to transmit the channel state report only when the acknowledgment feedback for the downlink channel is negative. Additionally, the UE may receive multiple SP configurations, where each SPS configuration includes a channel state report configuration specific to that SPS configuration (e.g., indicated in the respective SPS configurations, in the activation DCI, etc.).

A method of wireless communications at a UE is described. The method may include receiving, from a base station, a SPS configuration for the UE; receiving, from the base station, DCI for activating the SPS configuration; determining, based on the DCI, the SPS configuration, or both, a channel state report configuration for the SPS configuration; and transmitting, to the base station and in accordance with the channel state report configuration, a channel state report for a downlink shared channel received according to the SPS configuration.

An apparatus for wireless communications at a UE is described. The apparatus may include a processor, memory coupled with the processor, and instructions stored in the memory. The instructions may be executable by the processor to cause the apparatus to receive, from a base station, a SPS configuration for the UE; to receive, from the base station, DCI for activating the SPS configuration; to determine, based on the DCI, the SPS configuration, or both, a channel state report configuration for the SPS configuration; and to transmit, to the base station and in accordance with the channel state report configuration, a channel state report for a downlink shared channel received according to the SPS configuration.

Another apparatus for wireless communications at a UE is described. The apparatus may include means for receiving, from a base station, a SPS configuration for the UE; means for receiving, from the base station, DCI for activating the SPS configuration; means for determining, based on the DCI, the SPS configuration, or both, a channel state report configuration for the SPS configuration; and means for transmitting, to the base station and in accordance with the channel state report configuration, a channel state report for a downlink shared channel received according to the SPS configuration.

A non-transitory computer-readable medium storing code for wireless communications at a UE is described. The code may include instructions executable by a processor to receive, from a base station, a SPS configuration for the UE; to receive, from the base station, DCI for activating the SPS configuration; to determine, based on the DCI, the SPS configuration, or both, a channel state report configuration for the SPS configuration; and to transmit, to the base station and in accordance with the channel state report configuration, a channel state report for a downlink shared channel received according to the SPS configuration.

Some examples of the method, apparatuses, and non-transitory computer-readable medium described herein may further include operations, features, means, or instructions for receiving, from the base station, the downlink shared channel according to the SPS configuration, where the downlink shared channel may be indicated by the DCI; for determining acknowledgment feedback for the downlink shared channel, the acknowledgment feedback based on attempting to decode the downlink shared channel; and for transmitting, to the base station, the acknowledgment feedback for the downlink shared channel, where the acknowledgment feedback may be transmitted with the channel state report.

In some examples of the method, apparatuses, and non-transitory computer-readable medium described herein, determining the channel state report configuration for the SPS configuration may include operations, features, means, or instructions for identifying that the SPS configuration includes an indication of one of a set of channel state report configurations and for determining that the channel state report configuration may be the one of the set of channel state report configurations based on receipt of the DCI.

In some examples of the method, apparatuses, and non-transitory computer-readable medium described herein, the channel state report and an acknowledgment feedback for the downlink shared channel may be transmitted together, regardless of whether the UE successfully decoded the downlink shared channel.

In some examples of the method, apparatuses, and non-transitory computer-readable medium described herein, the channel state report and an acknowledgment feedback for the downlink shared channel may be transmitted together when the UE fails to decode the downlink shared channel.

In some examples of the method, apparatuses, and non-transitory computer-readable medium described herein, determining the channel state report configuration for the SPS configuration may include operations, features, means, or instructions for identifying that the DCI includes an indication of one of a set of channel state report configurations, where the channel state report configuration is the one of the set of channel state report configurations indicated by the DCI.

In some examples of the method, apparatuses, and non-transitory computer-readable medium described herein, the indication in the DCI may include a bit field that activates a configured channel state report configuration included in the SPS configuration, where the SPS configuration includes one or more configured channel state report configurations.

In some examples of the method, apparatuses, and non-transitory computer-readable medium described herein, the SPS configuration may include multiple SPS configurations, where the indication in the DCI includes a multi-bit field indicating respective channel state report configurations for each of the multiple SPS configurations.

Some examples of the method, apparatuses, and non-transitory computer-readable medium described herein may further include operations, features, means, or instructions for receiving an additional DCI indicating that the SPS configuration is to be released, the additional DCI including a bit field for indication of the channel state report configuration, and for refraining from future transmission of the channel state report based on receipt of the additional DCI.

In some examples of the method, apparatuses, and non-transitory computer-readable medium described herein, the bit field may include a predetermined value indicative of the release of the SPS configuration.

In some examples of the method, apparatuses, and non-transitory computer-readable medium described herein, the SPS configuration may include a set of configuration parameters of time resources, frequency resources, a modulation and coding scheme (MCS), or a combination thereof for the SPS configuration.

In some examples of the method, apparatuses, and non-transitory computer-readable medium described herein, the SPS configuration may include a set of SPS configurations, and the DCI may pertain to one or more of the set of SPS configurations.

In some examples of the method, apparatuses, and non-transitory computer-readable medium described herein, one or more SPS configurations may be configured for a single carrier of the UE.

A method of wireless communications at a base station is described. The method may include transmitting, to a UE, a SPS configuration for communications with the UE; transmitting, to the UE, DCI for activating the SPS configuration, where the DCI activates a channel state report configuration for the SPS configuration; and receiving, from the UE and in accordance with the channel state report configuration, a channel state report for a downlink shared channel received according to the SPS configuration.

An apparatus for wireless communications at a base station is described. The apparatus may include a processor, memory coupled with the processor, and instructions stored in the memory. The instructions may be executable by the processor to cause the apparatus to transmit, to a UE, a SPS configuration for communications with the UE; to transmit, to the UE, DCI for activating the SPS configuration, where the DCI activates a channel state report configuration for the SPS configuration; and to receive, from the UE and in accordance with the channel state report configuration, a channel state report for a downlink shared channel received according to the SPS configuration.

Another apparatus for wireless communications at a base station is described. The apparatus may include means for transmitting, to a UE, a SPS configuration for communications with the UE; means for transmitting, to the UE, DCI for activating the SPS configuration, where the DCI activates a channel state report configuration for the SPS configuration; and means for receiving, from the UE and in accordance with the channel state report configuration, a channel state report for a downlink shared channel received according to the SPS configuration.

A non-transitory computer-readable medium storing code for wireless communications at a base station is described. The code may include instructions executable by a processor to transmit, to a UE, a SPS configuration for communications with the UE; to transmit, to the UE, DCI for activating the SPS configuration, where the DCI activates a channel state report configuration for the SPS configuration; and to receive, from the UE and in accordance with the channel state report configuration, a channel state report for a downlink shared channel received according to the SPS configuration.

Some examples of the method, apparatuses, and nontransitory computer-readable medium described herein may further include operations, features, means, or instructions for transmitting, to the UE, the downlink shared channel according to the SPS configuration, where the downlink shared channel may be indicated by the DCI, and for receiving, from the UE, acknowledgment feedback for the downlink shared channel, where the acknowledgment feedback may be received with the channel state report.

Some examples of the method, apparatuses, and nontransitory computer-readable medium described herein may further include operations, features, means, or instructions for transmitting, to the UE, an indication of one of a set of channel state report configurations with the SPS configuration, where the channel state report configuration is the one of the set of channel state report configurations.

In some examples of the method, apparatuses, and nontransitory computer-readable medium described herein, the channel state report and an acknowledgment feedback for the downlink shared channel may be received together, regardless of whether the UE successfully decoded the downlink shared channel.

In some examples of the method, apparatuses, and nontransitory computer-readable medium described herein, the channel state report and an acknowledgment feedback for the downlink shared channel may be received together when the UE fails to decode the downlink shared channel.

Some examples of the method, apparatuses, and nontransitory computer-readable medium described herein may further include operations, features, means, or instructions for transmitting, to the UE, an indication of one of a set of channel state report configurations in the DCI, where the channel state report configuration may be the one of the set of channel state report configurations indicated by the DCI.

In some examples of the method, apparatuses, and nontransitory computer-readable medium described herein, the indication in the DCI may include a bit field that activates a configured channel state report configuration included in the SPS configuration, where the SPS configuration includes one or more configured channel state report configurations.

In some examples of the method, apparatuses, and nontransitory computer-readable medium described herein, the SPS configuration may include multiple SPS configurations, where the indication in the DCI includes a multi-bit field indicating respective channel state report configurations for each of the multiple SPS configurations.

Some examples of the method, apparatuses, and nontransitory computer-readable medium described herein may further include operations, features, means, or instructions for transmitting, to the UE, an additional DCI indicating that the SPS configuration is to be released, the additional DCI including a bit field for indication of the channel state report configuration, where the channel state report may be not received in a future transmission from the UE based on the additional DCI.

In some examples of the method, apparatuses, and nontransitory computer-readable medium described herein, the bit field may include a predetermined value indicative of the release of the SPS configuration.

In some examples of the method, apparatuses, and nontransitory computer-readable medium described herein, the SPS configuration may include a set of configuration parameters of time resources, frequency resources, an MCS, or a combination thereof for the SPS configuration.

In some examples of the method, apparatuses, and nontransitory computer-readable medium described herein, the SPS configuration may include a set of SPS configurations, and the DCI may pertain to one or more of the set of SPS configurations.

In some examples of the method, apparatuses, and nontransitory computer-readable medium described herein, one or more SPS configurations may be configured for a single carrier of the UE.

BRIEF DESCRIPTION OF THE DRAWINGS

FIGS. 13 through 17 show flowcharts illustrating methods that support downlink triggered CSI reporting for SPS in accordance with aspects of the present disclosure.

DETAILED DESCRIPTION

Figure 1:
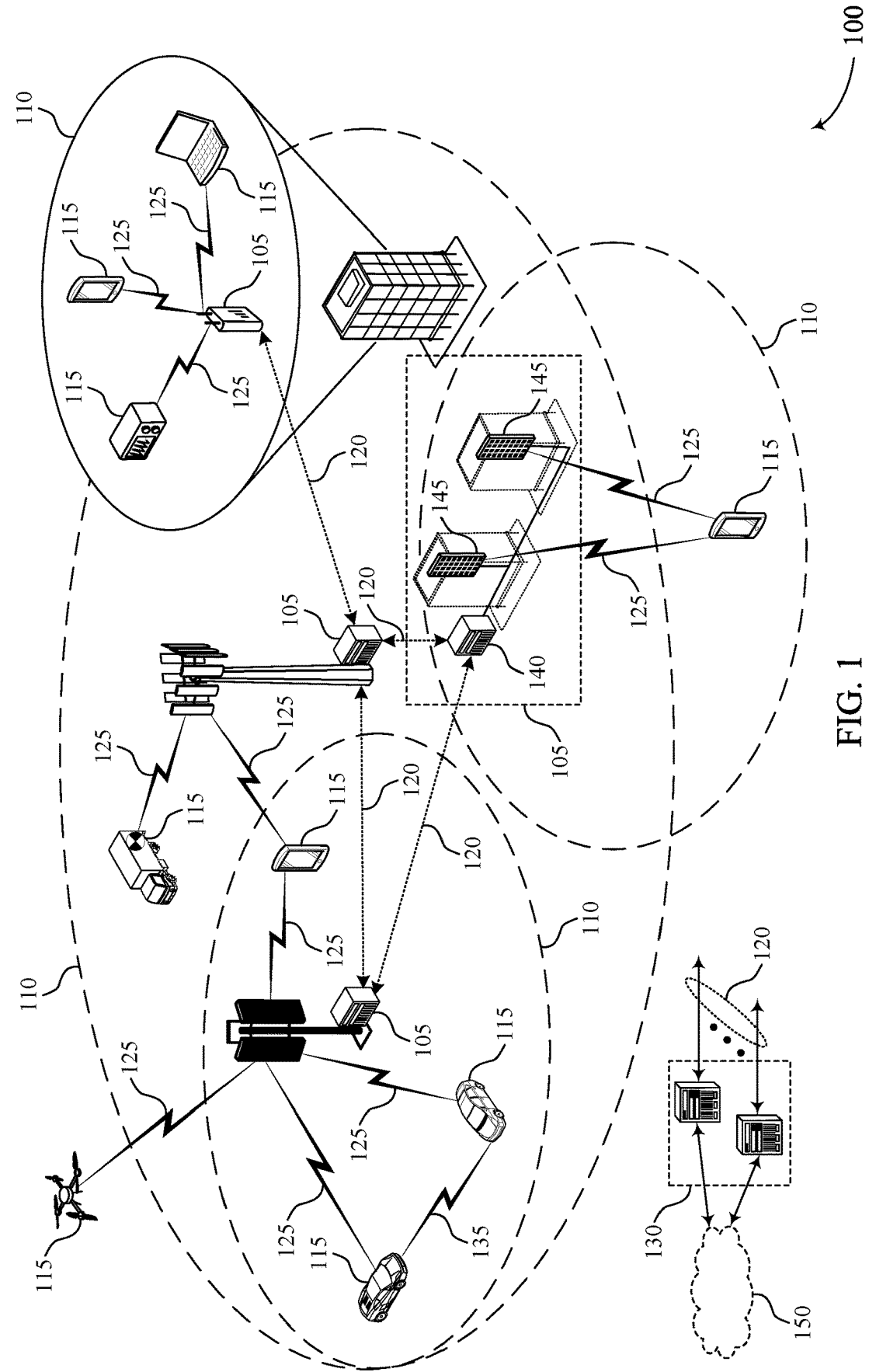
FIG. 1 illustrates an example of a system for wireless communications that supports downlink triggered channel state information (CSI) reporting for semi-persistent scheduling (SPS) in accordance with aspects of the present disclosure.

In some wireless communications systems, a base station may configure a user equipment (UE) for receiving periodic downlink traffic according to a semi-persistent scheduling (SPS) configuration and for transmitting acknowledgment feedback for the periodic downlink traffic. For example, the SPS configuration may include periodic downlink messages transmitted by the base station on a physical downlink shared channel (PDSCH) every 'X' slots (e.g., every slot, every second slot, every fourth slot, etc.). Subsequently, the UE may transmit the acknowledgment feedback on a physical uplink control channel (PUCCH) after receiving a periodic downlink message (e.g., on time-frequency resources configured by the base station, such as in a next occurring slot, two slots later, etc.). Conventionally, for acknowledgment feedback reporting, the base station may make one or more adjustments for a retransmission of the periodic downlink messages when a negative acknowledgment (NACK) feedback is received from the UE. These adjustments, however, may be slow based on the base station not knowing how to adjust the retransmission to increase chances that the UE is able to receive and decode the periodic downlink message(s) (e.g., with the retransmission(s)). For example, the base station may make too conservative or too extreme adjustments to the retransmission of the periodic downlink message(s) such that the UE is still unable to decode the retransmission (e.g., too conservative) or an unnecessary amount of resources are used for the retransmission (e.g., too extreme).

To better indicate how the transmission/retransmission of the periodic downlink message(s) should be adjusted, the UE may transmit channel state information (CSI) and/or channel quality indicator (CQI) feedback for the previously-received periodic downlink message(s), allowing the base station to identify which adjustments to make (e.g., increase modulation and coding scheme (MCS) by a certain amount, increase time/frequency resources used, etc.). In some cases, the UE may be configured to transmit the CSI/CQI feedback with the acknowledgment feedback according to different reporting modes. For example, a first reporting mode (e.g., Type 1) may include the UE reporting the CSI/CQI feedback with each acknowledgment feedback regardless of if the periodic downlink message is successfully received and decoded or not. Alternatively, a second reporting mode (e.g., Type 2) may include the UE reporting the CSI/CQI feedback when transmitting a NACK for a received periodic downlink message. However, when the UE is configured with an SPS configuration for communications with the base station, the UE may not know which reporting mode to use when transmitting the CSI/CQI information with the acknowledgment feedback. Additionally, the UE may be configured with more than one SPS configuration.

The techniques described herein may allow for indication and activation of a CSI/CQI reporting configuration for each SPS configuration of a UE. For each SPS configuration, either the first reporting mode or the second reporting mode for triggering the CSI/CQI reporting configuration (e.g., a Type 1 or a Type 2 downlink CSI/CQI triggering configuration) may be configured for the UE within the SPS configuration. The base station may then use an activation downlink control information (DCI) associated with the SPS configuration to activate the CSI/CQI reporting configuration. Alternatively, for each SPS configuration, either the first reporting mode, the second reporting mode for triggering the CSI/CQI reporting configuration, both reporting modes, or neither reporting modes may be configured, and the activation DCI may include a bit field to indicate which configured CSI configuration is actually activated. The above described techniques may be used for a single SPS configuration or for multiple SPS configurations. Additionally, if the DCI (e.g., a subsequent DCI in addition or alternative to the activation DCI) indicates a release for an SPS configuration, the UE may refrain from transmitting CSI/CQI reports with a positive acknowledgment (ACK) feedback acknowledging the release.

Aspects of the disclosure are initially described in the context of wireless communications systems. Additionally, aspects of the disclosure are illustrated through an acknowledgment feedback configuration, an additional wireless communications system, and a process flow. Aspects of the disclosure are further illustrated by and described with reference to apparatus diagrams, system diagrams, and flowcharts that relate to downlink triggered CSI reporting for SPS.

FIG. 1 illustrates an example of a wireless communications system 100 that supports downlink triggered channel state information reporting for semi-persistent scheduling in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_S=1/(\Delta f_{ma}\cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORE-SET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to the network operators IP services 150. The operators IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

As part of the HARQ feedback, a UE 115 may transmit a positive acknowledgment (e.g., an ACK) feedback message when a downlink message received from a base station 105 is successfully received and decoded by the UE 115. Alternatively, if the UE 115 is unable to successfully receive and/or decode the downlink message received from the base station 105, the UE 115 may then transmit a NACK feedback message. Accordingly, the NACK feedback message may indicate for the base station 105 to retransmit the downlink message to the UE 115 (e.g., in the same slot or a subsequent slot), where the UE 115 can attempt to receive and decode the retransmission alone or can combine the retransmission with the initial transmission of the downlink message to successfully receive and decode the downlink message wholly.

However, in some cases, the base station 105 may not know a configuration for retransmitting the downlink message that would increase chances that the UE 115 is able to successfully receive and decode the downlink message. For example, the NACK feedback message may merely indicate that the UE 115 was unable to receive/decode the downlink message with no further information to indicate adjustments for the base station 105 to make. As such, the base station 105 may make a guess on a new configuration with adjustments made to the initial transmission of the downlink message to use for the retransmission, but the new configuration may include too conservative or too extreme adjustments for the retransmission such that the UE 115 is still unable to decode the retransmission (e.g., too conservative) or an unnecessary amount of resources are used for the retransmission (e.g., too extreme). To help the base station 105 make a more informed decision on a configuration to use for the retransmission, the UE 115 may transmit additional information about a state of the channel the downlink message is received on with the acknowledgment feedback. The additional information that the UE 115 provides with the acknowledgment feedback is described in greater detail in FIGS. 2 and 3.

Figure 2:
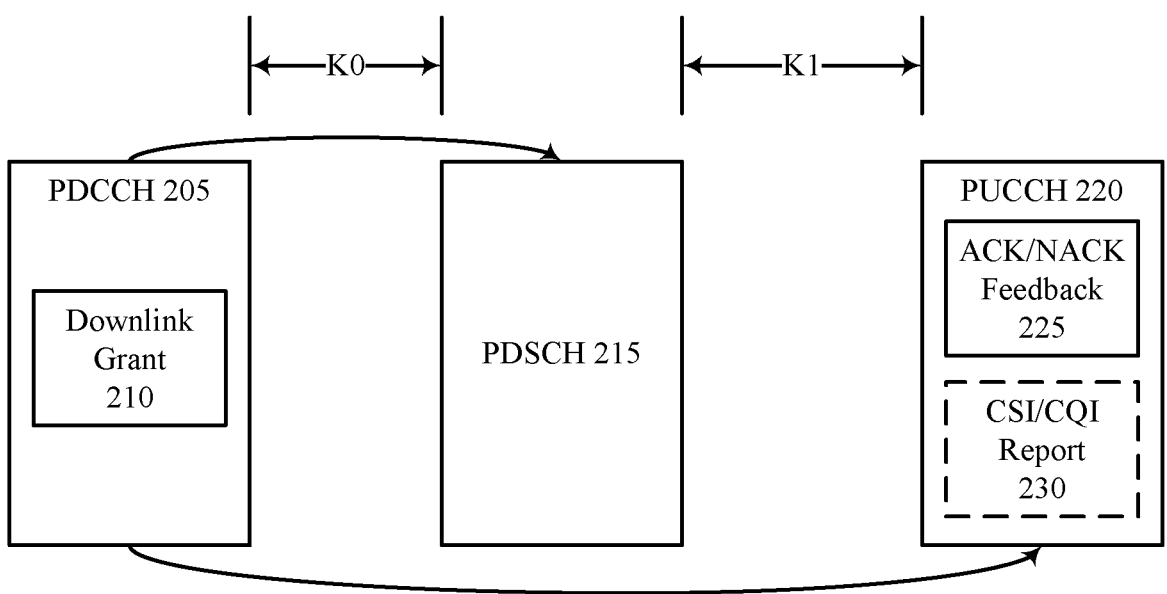
FIG. 2 illustrates an example of an acknowledgment feedback configuration that supports downlink triggered CSI reporting for SPS in accordance with aspects of the present disclosure.

FIG. 2 illustrates an example of an acknowledgment feedback configuration 200 that supports downlink triggered CSI reporting for SPS in accordance with aspects of the present disclosure. In some examples, acknowledgment feedback configuration 200 may implement aspects of wireless communications system 100. Acknowledgment feedback configuration 200 may be utilized by a base station 105 and a UE 115 for the UE 115 to provide acknowledgment feedback for downlink messages received from the base station 105.

As described herein, the UE 115 may support downlink SPS for receiving periodic downlink traffic from the base station 105. For example, the base station 105 may transmit a grant scheduling multiple occasions (e.g., SPS occasions) for downlink receptions (e.g., an SPS configuration) that the UE 115 monitors for receiving the periodic downlink traffic, where the multiple occasions occur according to a periodic configuration (e.g., every slot, every second slot, every fourth slot, etc.). In some cases, the base station 105 may transmit the grant for the SPS configuration in a physical downlink control channel (PDCCH) 205. Additionally or alternatively, the base station 105 may transmit the grant for the SPS configuration in a previous downlink message (e.g., an RRC configuration message, DCI, or additional downlink message), and the UE 115 may monitor for and receive the PDCCH 205 during an occasion indicated by the SPS configuration.

Subsequently, the UE 115 may identify and receive a downlink grant 210 in the PDCCH 205 that indicates information (e.g., resources, configuration information, etc.) about downlink messages coming from the base station 105 that are intended for the UE 115. For example, the UE 115 may monitor for and receive the downlink messages in a PDSCH 215 indicated by the downlink grant 210. Additionally or alternatively, when the downlink grant 210 includes the SPS configuration, the downlink grant 210 may indicate multiple PDSCHs 215 for the UE 115 to monitor for and receive periodically (e.g., according to the SPS configuration). In some cases, the downlink grant 210 may include an indication of a first time delay (K0) between receiving the PDCCH 205 and receiving the PDSCH 215. For example, the UE 115 may determine K0 implicitly based on a time-domain resource allocation (TDRA) table received in the downlink grant 210 (e.g., or in an additional downlink grant indicating the SPS configuration; via a DCI format 1_0, 1_1, or 1_2; via PDCCH 205; etc.). In some cases, K0 may be zero (0).

Additionally, the base station 105 may configure the UE 115 to provide acknowledgment feedback for the periodic downlink traffic transmitted according to the SPS configuration (e.g., the PDSCH 215). For example, the base station 105 may indicate resources (e.g., time-frequency resources) of a physical uplink control channel (PUCCH) 220 (e.g., an uplink channel) for the UE 115 to transmit the acknowledgment feedback, where the acknowledgment feedback may include an ACK/NACK feedback 225 (e.g., ACK for a positive/successful reception and decoding of the PDSCH 215 or a NACK for a negative/unsuccessful reception and/or decoding of the PDSCH 215). In some cases, the base station 105 may transmit the configuration information for transmitting the acknowledgment feedback with the grant for the SPS configuration (e.g., the downlink grant 210).

The resources used for transmitting the acknowledgment feedback may occur in any slot occurring after the periodic downlink traffic is received (e.g., a next occurring slot, two slots after the downlink traffic is received, three slots after, etc.). In some cases, the UE 115 may transmit the acknowledgment feedback (e.g., the ACK/NACK feedback 225) in the PUCCH 220 according to a second time delay (K1) after receiving the PDSCH 215 (e.g., the periodic traffic for the SPS configuration). For example, the base station 105 may indicate K1 explicitly in the downlink grant 210 (e.g., or in an additional downlink grant indicating the SPS configuration; via a DCI format 1_0, 1_1, or 1_2; via PDCCH 205; etc.). While the periodicities and acknowledgment feedback transmission are discussed in terms of slots above, the SPS configurations may include periodicities of less than a slot (e.g., a half-slot, a mini-slot, two OFDM symbols, etc.). For example, multiple occasions may occur for transmitting/receiving downlink traffic for an SPS configuration within a slot (e.g., two downlink SPS occasions per slot).

If the UE 115 transmits a NACK for ACK/NACK feedback 225 (e.g., the acknowledgment feedback) to indicate the PDSCH 215 is unsuccessfully received/decoded, the base station 105 may use link adaptation for a retransmission of the downlink data/information/messages included in the PDSCH 215. However, the link adaptation used by the base station 105 (e.g., rate adjustment, MCS adjustment, transmit power adaptation, additional adjustments, etc.) for the retransmission of the PDSCH 215 may be slow when the NACK is received at the base station 105. Conventionally, no CQI, CSI, or additional channel information may be associated with the NACK (e.g., transmitted in the PUCCH 220 with the ACK/NACK feedback 225). Accordingly, the base station 105 may not know how to adjust an MCS/rate for the retransmission. For example, the UE 115 may not include an indication of how many resources (e.g., time-frequency resources) are needed for the retransmission, so the base station 105 may guess the amount of resources to use for the retransmission, which may lead to a conservative or excessive amount of resources used for the retransmission.

In some cases, the UE 115 may transmit CQI/CSI feedback to indicate information (e.g., CQI may be calculated based on a signal-to-interference-plus-noise (SINR) of the PDSCH 215) about a downlink channel (e.g., the PDSCH 215) to the base station 105 on a periodic or an aperiodic schedule. For example, the periodic CSI (P-CSI) feedback may not be flexible (e.g., transmitted according to the periodic schedule and not at other times), and the aperiodic CSI (A-CSI) feedback may be triggered by a separate uplink grant the base station 105 transmits to the UE 115 on an as-needed basis when channel information is needed/wanted by the base station 105, where the separate uplink grant indicates resources for the UE 115 to transmit the A-CSI feedback. That is, A-CSI feedback may be triggered by an uplink grant and cannot be sent autonomously by the UE 115 (e.g., based on the periodic schedule or SPS configuration). Accordingly, based on needing the separate uplink grant, the timeline of the A-CSI feedback may be slower than a timeline for the ACK/NACK feedback 225 (e.g., the UE 115 cannot transmit the CSI feedback in a same slot that the PDSCH 215 is scheduled even if both are scheduled at the same slot). While the above described discussion concerns CSI feedback, the same setbacks apply for CQI feedback.

To mitigate these slower timelines associated with transmitting CSI/CQI feedback, the UE 115 may associate or bundle CQI/CSI feedback with the ACK/NACK feedback 225 to allow the base station 105 to do faster and more accurate MCS adjustments, rate adjustments, transmit power adaptions, or a combination thereof. For example, the UE 115 may transmit a CSI/CQI report 230 in the PUCCH 220 when transmitting ACK/NACK feedback 225 (e.g., the ACK/NACK feedback 225 and the CSI/CQI report 230 may be included in a single message of the PUCCH 220 or in separate messages of the PUCCH 220). As such, the UE 115 may save one uplink grant that would grant the resources for the CSI/CQI feedback.

In particular, the CSI/CQI report 230 may be triggered by the downlink grant 210 either explicitly (e.g., by an information field in the DCI) or implicitly (e.g., triggered by a NACK.). For example, a field in the DCI of the downlink grant 210 (e.g., or an additional downlink grant, in the PDCCH 205, etc.) may indicate for the UE 115 to transmit the CSI/CQI report 230 (e.g., in the PUCCH 220 or in a subsequent physical uplink shared channel (PUSCH)) based on attempting to decode the PDSCH 215. In some cases, the field may indicate for the UE 115 to transmit the CSI/CQI report 230 whether the PDSCH 215 is successfully decoded or not. The base station 105 may indicate for the UE 115 to transmit the CSI/CQI report 230 in such a way (e.g., whether an ACK or a NACK is transmitted for the PDSCH 215 in the ACK/NACK feedback 225) to better adjust subsequent transmissions (e.g., additional transmissions, retransmissions, etc.) on the same channel. Alternatively, the field may indicate for the UE 115 to transmit the CSI/CQI report 230 only if the PDSCH 215 is unsuccessfully decoded/received (e.g., a NACK is transmitted for ACK/NACK feedback 225). The base station 105 may indicate for the UE 115 to transmit the CSI/CQI report 230 when the PDSCH 215 is unsuccessful (e.g., the NACK) to identify the adjustments to make for a better retransmission of the PDSCH 215 (e.g., a same transport block (TB)). For example, the UE 115 may determine a TB is successfully decoded by combining a first transmission of a TB (e.g., in a first PDSCH 215) with a retransmission (e.g., using the adjustments) of the TB (e.g., in a subsequent PDSCH).

The base station 105 may indicate for the UE 115 to transmit the CSI/CQI report 230 with the ACK/NACK feedback 225 for scenarios with high-reliability and low latency requirements (e.g., URLLC). For example, a turbo HARQ-acknowledgment (e.g., Turbo HARQ-ACK, Turbo-ACK, etc.) feedback system (e.g., transmitting the CSI/CQI report 230 with the ACK/NACK feedback 225) may enable a more reliable retransmission, where one (1) retransmission is enough to guarantee the high-reliability (e.g., $10^{-5}$ reliability) and the low latency (e.g., five (5) ms latency) requirements. Alternatively, (e.g., with other HARQ-ACK systems), more retransmissions may be needed as the adaptation of MCS, rate, power, etc. is slower.

In some cases, the UE 115 may rely on DCI for triggering CSI/CQI reporting. Additionally, the downlink triggered CSI/CQI reports (e.g., via DCI) can further be categorized into two types. A first type (e.g., Type 1) may include regular triggering, where the UE 115 transmits the CSI/CQI report 230 with each ACK/NACK feedback 225 reported (e.g., regardless of the acknowledgment feedback included in the ACK/NACK feedback 225). For example, for the Type 1 CSI/CQI reporting, the downlink CSI may not be triggered by the UE 115 (e.g., L1 procedures/signaling/determination), where a PDSCH decoding failure identified by the UE 115 triggers the UE 115 to transmit the CSI/CQI report 230. Instead, the Type 1 CSI/CQI reporting may enable a more flexible CSI/CQI triggering and transmission (e.g., on the PUCCH 220), similar to the A-CSI triggering as described above (e.g., with DCI signaling an uplink grant and reporting the CSI/CQI report 230 on a PUSCH).

Additionally or alternatively, a second type (e.g., Type 2) may include selective triggering similar to the turbo HARQ-acknowledgment triggering as described above, where the UE 115 transmits the CSI/CQI report 230 with the ACK/NACK feedback 225 when the ACK/NACK feedback 225 includes a NACK. For example, this Type 2 CSI/CQI reporting may include a downlink CSI/CQI triggering driven by the UE 115 (e.g., L1 procedures/signaling/determination), where a PDSCH decoding failure identified by the UE 115 triggers the UE 115 to transmit the CSI/CQI report 230. The PDSCH decoding failure may be used for triggering the CSI/CQI reporting as a last-resort HARQ operation to finish an urgent task. In some cases, the Type 2 CSI/CQI reporting may use an implicit indication for the UE 115 to transmit the CSI/CQI report 230 based on PDSCH decoding failures (e.g., NACKs).

However, when the UE 115 is configured with SPS communications (e.g., via one or more SPS configurations), the UE 115 may not know which CSI/CQI reporting mode to use. Accordingly, efficient techniques are desired for indicating which CSI/CQI reporting mode (e.g., Type 1, Type 2, etc.) the UE 115 is to use when transmitting acknowledgment feedback for a downlink message (e.g., the PDSCH 215) received according to an SPS configuration. As described herein and in more detail in FIG. 3, indication and activation of a CSI reporting configuration may be used for each SPS configuration of the UE 115. For example, for each SPS configuration, either a Type 1 or a Type 2 downlink CSI/CQI triggering configuration may be configured for the UE 115 within the SPS configuration, within an activation DCI for the SPS configuration, or a combination thereof.

Figure 3:
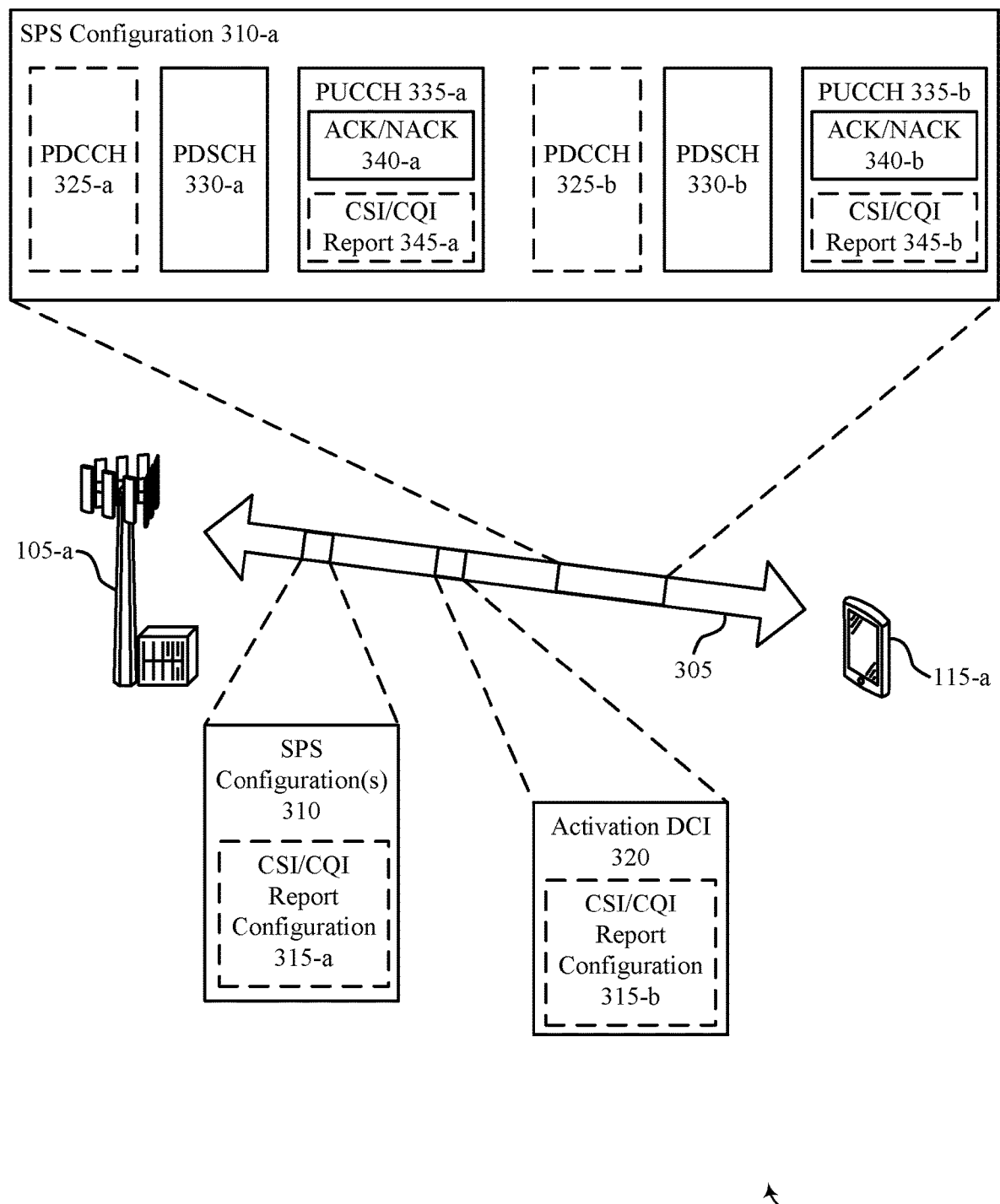
FIG. 3 illustrates an example of a wireless communications system that supports downlink triggered CSI reporting for SPS in accordance with aspects of the present disclosure.

FIG. 3 illustrates an example of a wireless communications system 300 that supports downlink triggered CSI reporting for SPS in accordance with aspects of the present disclosure. In some examples, wireless communications system 300 may implement aspects of wireless communications system 100 and acknowledgment feedback configuration 200. Wireless communications system 300 may include a base station 105-a and a UE 115-a, which may be examples of corresponding base stations 105 and UEs 115, respectively, as described above with reference to FIGS. 1 and 2. Additionally, as described herein, base station 105-a and UE 115-a may communicate according to an SPS configuration 310 (e.g., a downlink SPS configuration), where base station 105-a transmits periodic downlink traffic to UE 115-a (e.g., every slot, every second slot, every half-slot, every mini-slot, every two OFDM symbols, etc.) and UE 115-a transmits acknowledgment feedback to base station 105-a based on attempting to receive/decode the periodic downlink traffic. For example, UE 115-a and base station 105-a may communicate according to the SPS configuration 310 on resources of a carrier 305.

In some cases, UE 115-a may be configured with multiple SPS configurations 310 on a given carrier (e.g., carrier 305). Additionally, the configuration for each SPS configuration 310 may be done independently or separately. For example, each SPS configuration 310 may include specific parameters to that SPS configuration 310, where the parameters may include time resources, frequency resources, MCS, etc. specific to the SPS configuration 310. Accordingly, each SPS configuration 310 may have different configurations, partially different configurations, or a same configuration than other SPS configurations 310.

Additionally, a two-level priority of acknowledgment feedback (e.g., HARQ-ACK) may be supported in some wireless communications systems for dynamically scheduled PDSCH transmissions and for SPS PDSCH transmissions (e.g., and for acknowledgment feedback for an SPS PDSCH release transmission). In some cases, when activating an SPS configuration 310 (e.g., via an activating DCI), UE 115-a may not need to transmit an acknowledgment feedback message indicating the activation message was successfully received and decoded before starting to use the SPS configuration 310. Additionally or alternatively, when the SPS configuration 310 is released (e.g., via a release message/transmission), UE 115-a may have to transmit an ACK to acknowledge that the SPS configuration 310 has been released (e.g., the UE 115 is no longer communicating according to the SPS configuration 310). In some cases, an explicit indication (e.g., an RRC parameter) in each SPS PDSCH configuration may provide mapping to corresponding acknowledgment codebooks (e.g., HARQ-ACK codebooks) for SPS PDSCH transmissions and ACKs for SPS PDSCH release transmissions.

Base station 105-a may transmit an indication of SPS configuration(s) 310 to UE 115-a (e.g., in an RRC message, a DCI, a PDCCH, a downlink grant, etc.) to configure UE 115-a to monitor for and receive downlink messages (e.g., downlink data, information, etc.) periodically according to the SPS configuration(s) 310. For example, as described above, the SPS configuration(s) 310 may include resource allocations (e.g., time resources, frequency resources, etc.) for receiving the periodic downlink messages and transmitting any associated uplink messages, as well as additional configuration parameters (e.g., MCS, transmit power control (TPC) command, redundancy version, etc.) for the periodic traffic. However, UE 115-a may not use one of the indicated SPS configuration(s) 310 until the SPS configuration(s) 310 are activated by an activation DCI 320. For example, the activation DCI 320 may include an indication for UE 115-a to start using one of the SPS configurations 310 for subsequent communications with base station 105-a.

As shown, the activation DCI 320 may indicate for UE 115-a to start using an SPS configuration 310-a to communicate with base station 105-a. For example, SPS configuration 310-a may include one or more PDCCHs 325 that UE 115-a is to monitor for from base station 105-a, one or more associated PDSCHs 330 as indicated by the PDCCHs 325, and one or more PUCCHs 335 that UE 115-a uses to transmit acknowledgment feedback to base station 105-a based on attempting to receive and decode the PDSCHs 330. In some cases, SPS configuration 310-a may include a first PDCCH 325-a carrying a downlink grant that indicates or schedules each of the subsequent PDSCHs 330 and PUCCHs 335 (e.g., including corresponding time delays, K0 and K1). Additionally or alternatively, SPS configuration 310-a may not include the PDCCHs 325 and may use the SPS configuration(s) 310 received previously to identify when and where occasions for the PDSCHs 330 and PUCCHs 335 are occurring.

However, as described above in FIG. 2, based on communicating with base station 105-a according to the SPS configuration(s) 310, UE 115-a may not know when to transmit a CSI/CQI report 345 in a PUCCH 335. For example, the PUCCH 335 may carry an ACK/NACK 340 (e.g., acknowledgment feedback) based on whether UE 115-a is able to successfully receive and decode a PDSCH 330 (e.g., an ACK) or not (e.g., a NACK), and UE 115-*a* may not know whether to include the CSI/CQI report 345 with the ACK/NACK 340 in the PUCCH 335 based on a Type 1 CSI reporting configuration (e.g., regardless of transmitting an ACK or a NACK in the ACK/NACK 340) or a Type 2 CSI reporting configuration (e.g., only when transmitting a NACK in the ACK/NACK 340) as described above with reference to FIG. 2.

As described herein, wireless communications system 200 may include efficient techniques for triggering CSI/CQI reports for an SPS configuration. For example, for each SPS configuration 310, a CSI/CQI report configuration 315-*a* may be signaled with each SPS configuration 310 (e.g., either a Type 1 or Type 2 downlink CSI/CQI triggering may be configured). Once an SPS configuration 310 is activated (e.g., via the activation DCI 320), UE 115-*a* may transmit the CSI/CQI report 345 according to the configured mode for that SPS configuration 310. For example, the SPS configuration 310 may include the CSI/CQI report configuration 315-*a* (e.g., each SPS configuration 310 may be configured with a Type 1 or a Type 2 CSI/CQI reporting configuration), and the activation DCI 320 may trigger UE 115-*a* to use one of the SPS configurations 310 (e.g., SPS configuration 310-*a*) with the corresponding CSI/CQI report configuration 315-*a*.

For a Type 1 CSI/CQI report configuration, UE 115-*a* may transmit the CSI/CQI report 345 (e.g., and an associated ACK/NACK 340) for a first received PDSCH 330 of the SPS configuration 310 (e.g., or a specific indicated PDSCH 330). For example, UE 115-*a* may transmit a first CSI/CQI report 345-*a* with a first ACK/NACK 340-*a* in a first PUCCH 335-*a* for a first received PDSCH 330-*a* based on the Type 1 CSI/CQI report configuration, but not transmit a CSI/CQI report 345 for subsequent received PDSCHs 330 (e.g., refrain from transmitting a second CSI/CQI report 345-*b* with a second ACK/NACK 340-*b* in a second PUCCH 335-*b* for a second received PDSCH 330-*b*). Additionally or alternatively, for the Type 1 CSI/CQI report configuration, UE 115-*a* may transmit a CSI/CQI report 345 with an ACK/NACK 340 for every PDSCH 330 received according to the SPS configuration 310 (e.g., UE 115-*a* transmits both the first CSI/CQI report 345-*a* and the second CSI/CQI report 345-*b*). For a Type 2 CSI/CQI report configuration, UE 115-*a* may transmit a CSI/CQI report 345 report whenever any PDSCH 330 fails (e.g., when UE 115-*a* transmits a NACK in an ACK/NACK 340 for a corresponding PDSCH 330) that is received according to the SPS configuration 310. In some cases, including the CSI/CQI report configuration 315-*a* in the SPS configuration(s) 310 may be considered to be a semi-static signaling or hard-coded with the respective SPS configuration(s) 310.

Additionally or alternatively, for each SPS configuration 310, either the Type 1 CSI/CQI report configuration, the Type 2 CSI/CQI report configuration, both types, or no type may be configured. Subsequently, a bit field (e.g., one or more bits) in the activation DCI 320 may indicate which CSI/CQI report configuration type (e.g., a mode) UE 115-*a* should follow. For example, the bit field may be considered a CSI/CQI report configuration 315-*b* that indicates the Type 1 CSI/CQI report configuration or the Type 2 CSI/CQI report configuration for the activated SPS configuration 310, enabling UE 115-*a* to switch between types. Accordingly, signaling which CSI/CQI report configuration Type to use may be considered to be a dynamic signaling. In both cases (e.g., signaling which CSI/CQI report configuration type to use in the SPS configuration 310 or in the activation DCI 320), a single activation DCI 320 may be used to indicate an SPS configuration and corresponding CSI/CQI report configuration for UE 115-*a* to use.

In some cases, for a joint SPS activation (e.g., a single activation DCI 320 activates multiple SPS configuration(s) 310), signaling which CSI/CQI report configuration type to use in the SPS configuration 310 may be used. Alternatively, when using the signaling in the activation DCI 320 to indicate which CSI/CQI report configuration type to use, a multi-bit information field may be used to indicate the reporting mode (e.g., Type 1 or Type 2) for each of the activated SPS configurations 310.

Additionally, signaling which CSI/CQI report configuration type to use in the SPS configuration 310 (e.g., when a bit field is included in the activation DCI 320), UE 115-*a* may not transmit a CSI/CQI report 345 if a received DCI indicates for UE 115-*a* to release the SPS configuration 310 (e.g., all 0s, all 1s, or a different signaling for indicating the release). For example, when releasing an SPS configuration 310, a bit field in the DCI may be set to a predetermined value and be used for release validation. In some cases, a table may be configured such that when UE 115-*a* identifies the predetermined value for the bit field in the DCI, the table may indicate that the DCI is carrying a release indication for the SPS configuration 310. Accordingly, UE 115-*a* may transmit an ACK to acknowledge the SPS configuration 310 has been released and may refrain from transmitting a CSI/CQI report 345.

While two (2) PDCCHs 325, two (2) PDSCHs 330, and two (2) PUCCHs 335 are shown in the example of SPS configuration 310-*a,* it is to be understood that more or fewer respective channels may be used for the communications between UE 115-*a* and base station 105-*a*. For example, UE 115-*a* and base station 105-*a* may use SPS configuration 310-*a* until SPS configuration 310-*a* is released, which may result in a single occasion to monitor for a single PDSCH 330 (e.g., and transmit a single PUCCH 335) or multiple occasions to monitor for multiple PDSCHs 330 (e.g., and transmit multiple PUCCHs 335).

Figure 4:
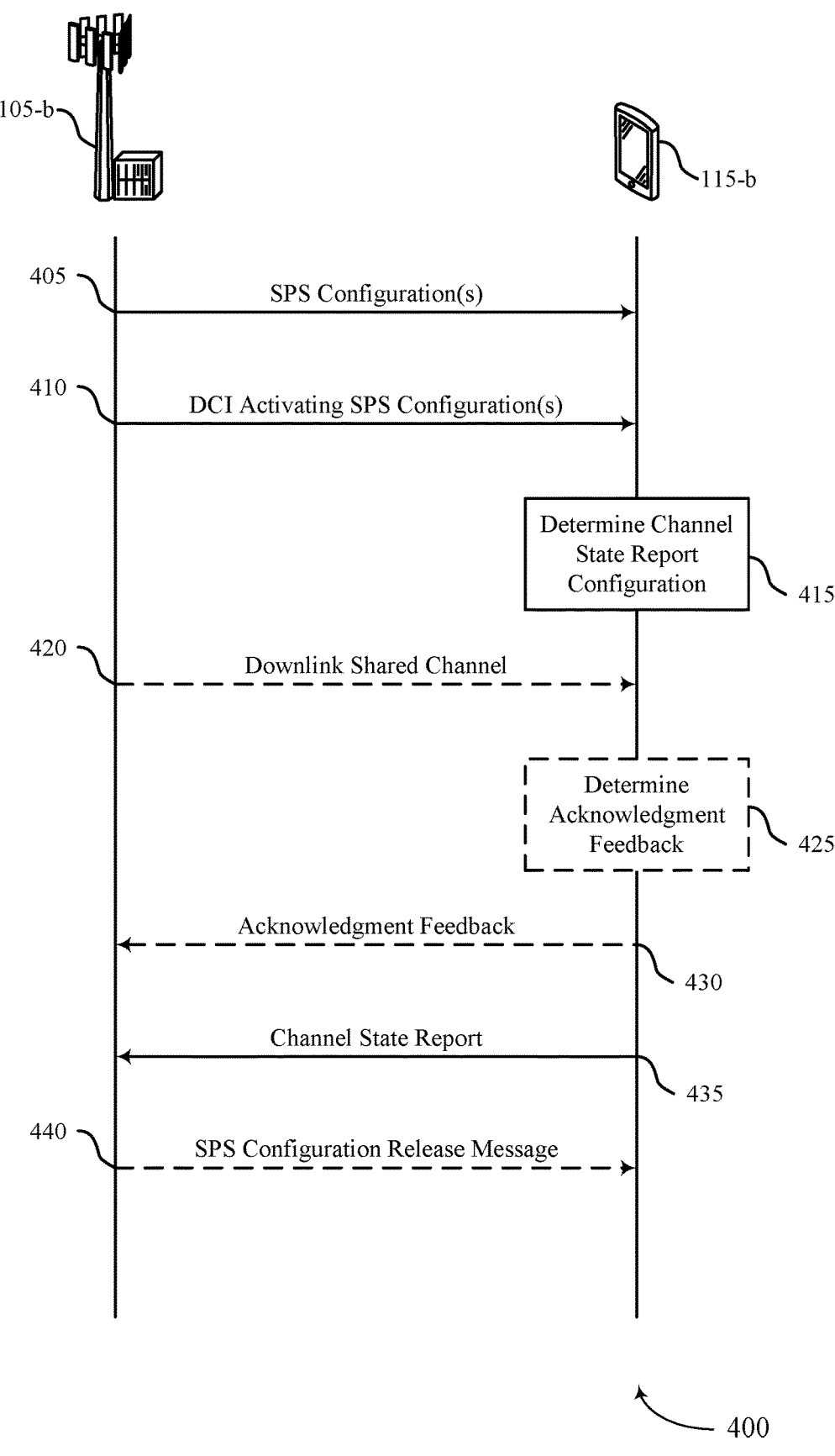
FIG. 4 illustrates an example of a process flow that supports downlink triggered CSI reporting for SPS in accordance with aspects of the present disclosure.

FIG. 4 illustrates an example of a process flow 400 that supports downlink triggered CSI reporting for SPS in accordance with aspects of the present disclosure. In some examples, process flow 400 may implement aspects of wireless communications systems 100 and/or 300. Process flow 400 may include a base station 105-*b* and a UE 115-*b,* which may be examples of corresponding base stations 105 and UEs 115, respectively, as described above with reference to FIGS. 1-3.

In the following description of the process flow 400, the operations between UE 115-*b* and base station 105-*b* may be performed in different orders or at different times. Certain operations may also be left out of the process flow 400, or other operations may be added to the process flow 400. While UE 115-*b* and base station 105-*b* are shown performing the operations of process flow 400, any wireless device may perform the operations shown.

At 405, UE 115-*b* may receive, from base station 105-*b,* an SPS configuration for UE 115-*b*. In some cases, the SPS configuration may include a set of configuration parameters of time resources, frequency resources, an MCS, or a combination thereof for the SPS configuration. Additionally, one or more SPS configurations may be configured for a single carrier of UE 115-*a*.

At 410, UE 115-*b* may receive, from base station 105-*b,* DCI for activating the SPS configuration (e.g., an activation DCI). In some cases, the SPS configuration received at 405 may include multiple SPS configurations, and the DCI may pertain to one or more of the multiple SPS configurations.

At 415, UE 115-*b* may determine, based on the DCI, the SPS configuration, or both, a channel state report configuration (e.g., a CSI/CQI report configuration) for the SPS configuration.

For example, in some cases, UE 115-*b* may identify that the SPS configuration includes an indication of one of a set of channel state report configurations and may determine that the channel state report configuration is the one of the set of channel state report configurations based on receipt of the DCI. In some cases, the channel state report and an acknowledgment feedback for a downlink shared channel received according to the SPS configuration may be transmitted together, regardless of whether UE 115-*b* successfully decoded the downlink shared channel. Alternatively, the channel state report and the acknowledgment feedback for the downlink shared channel may be transmitted together when UE 115-*b* fails to decode the downlink shared channel.

Additionally or alternatively, in some cases, UE 115-*b* may identify that the DCI includes an indication of one of a set of channel state report configurations, where the channel state report configuration is the one of the set of channel state report configurations indicated by the DCI. In some cases, the indication in the DCI may include a bit field that activates a configured channel state report configuration included in the SPS configuration, where the SPS configuration includes one or more configured channel state report configurations. Additionally, the SPS configuration may include multiple SPS configurations, and the indication in the DCI may include a multi-bit field indicating respective channel state report configurations for each of the multiple SPS configurations.

At 420, UE 115-*b* may receive, from base station 105-*b*, the downlink shared channel according to the SPS configuration, where the downlink shared channel is indicated by the DCI.

At 425, UE 115-*b* may determine acknowledgment feedback (e.g., ACK/NACK feedback) for the downlink shared channel, where the acknowledgment feedback is based on attempting to decode the downlink shared channel.

At 430, UE 115-*b* may transmit, to base station 105-*b*, the acknowledgment feedback for the downlink shared channel.

At 435, UE 115-*b* may transmit, to base station 105-*b* and in accordance with the channel state report configuration, a channel state report for the downlink shared channel received according to the SPS configuration. In some cases, the acknowledgment feedback may be transmitted with the channel state report.

At 440, UE 115-*b* may receive an additional DCI indicating that the SPS configuration is to be released, where the additional DCI includes a bit field for indication of the channel state report configuration. Accordingly, UE 115-*b* may refrain from future transmission of the channel state report based on receipt of the additional DCI. In some cases, the bit field may include a predetermined value indicative of the release of the SPS configuration.

Figure 5:
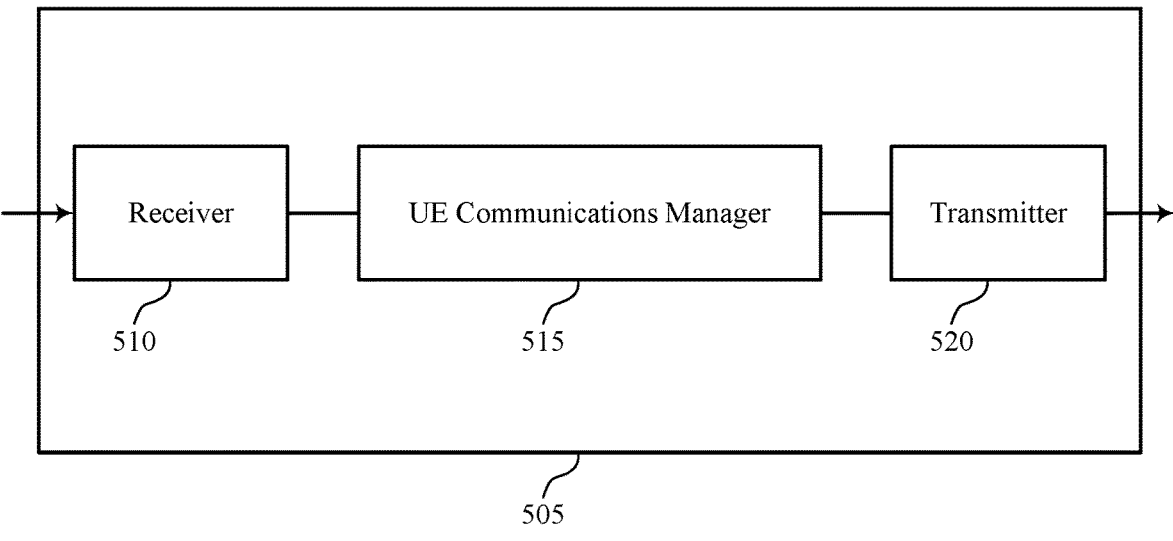
FIGS. 5 and 6 show block diagrams of devices that support downlink triggered CSI reporting for SPS in accordance with aspects of the present disclosure.

FIG. 5 shows a block diagram 500 of a device 505 that supports downlink triggered CSI reporting for SPS in accordance with aspects of the present disclosure. The device 505 may be an example of aspects of a UE 115 as described herein. The device 505 may include a receiver 510, a UE communications manager 515, and a transmitter 520. The device 505 may also include a processor. Each of these components may be in communication with one another (e.g., via one or more buses).

The receiver 510 may receive information such as packets, user data, or control information associated with various information channels (e.g., control channels, data channels, and information related to downlink triggered CSI reporting for SPS, etc.). Information may be passed on to other components of the device 505. The receiver 510 may be an example of aspects of the transceiver 820 described with reference to FIG. 8. The receiver 510 may utilize a single antenna or a set of antennas.

The UE communications manager 515 may receive, from a base station, an SPS configuration for the UE. Additionally, the UE communications manager 515 may receive, from the base station, DCI for activating the SPS configuration. In some cases, the UE communications manager 515 may determine, based on the DCI, the SPS configuration, or both, a channel state report configuration for the SPS configuration. Subsequently, the UE communications manager 515 may transmit, to the base station and in accordance with the channel state report configuration, a channel state report for a downlink shared channel received according to the SPS configuration. The UE communications manager 515 may be an example of aspects of the UE communications manager 810 described herein.

The UE communications manager 515, or its sub-components, may be implemented in hardware, code (e.g., software or firmware) executed by a processor, or any combination thereof. If implemented in code executed by a processor, the functions of the UE communications manager 515, or its sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure.

The UE communications manager 515, or its sub-components, may be physically located at various positions, including being distributed such that portions of functions are implemented at different physical locations by one or more physical components. In some examples, the UE communications manager 515, or its sub-components, may be a separate and distinct component in accordance with various aspects of the present disclosure. In some examples, the UE communications manager 515, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 520 may transmit signals generated by other components of the device 505. In some examples, the transmitter 520 may be collocated with a receiver 510 in a transceiver module. For example, the transmitter 520 may be an example of aspects of the transceiver 820 described with reference to FIG. 8. The transmitter 520 may utilize a single antenna or a set of antennas.

Figure 6:
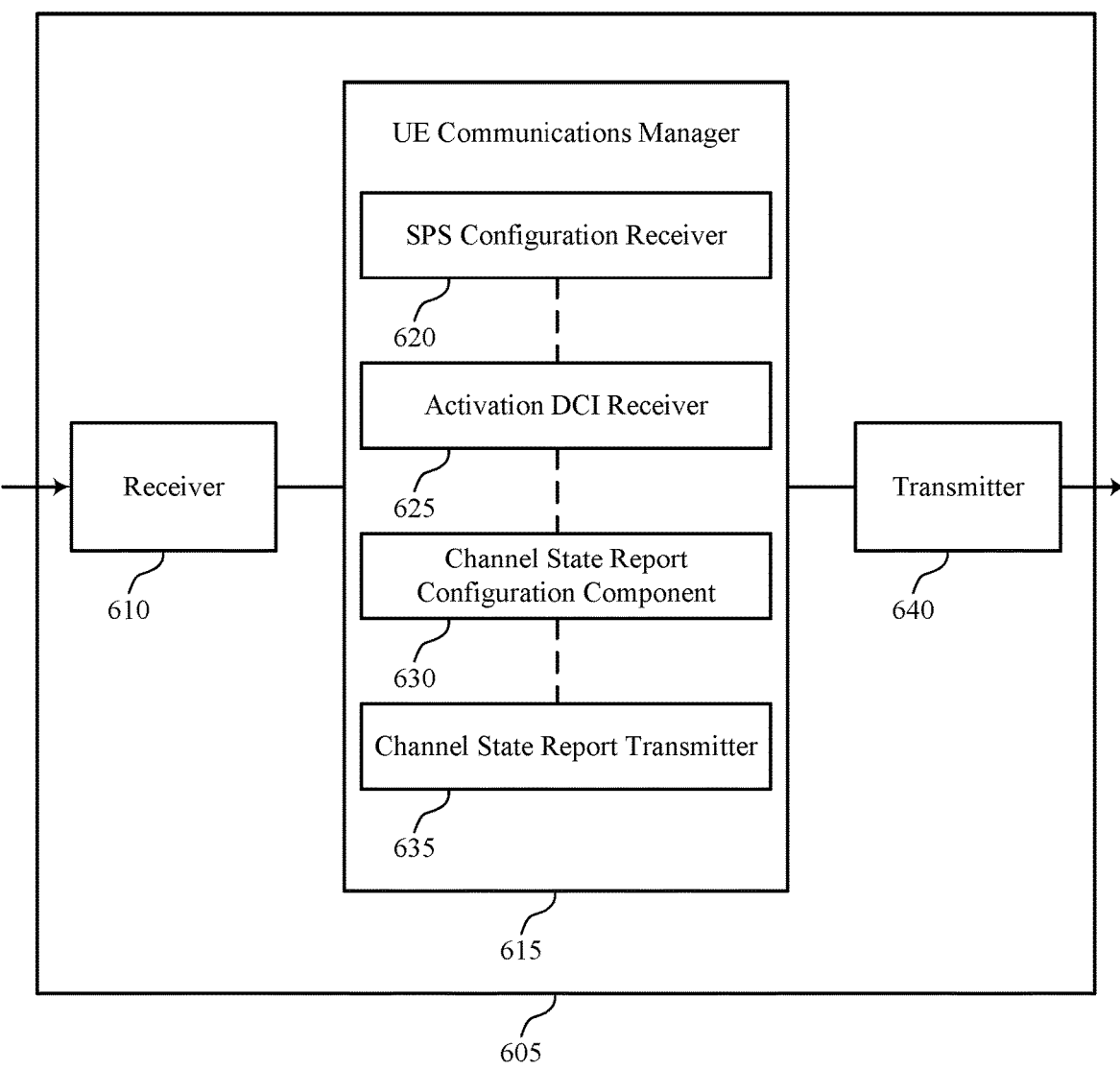

FIG. 6 shows a block diagram 600 of a device 605 that supports downlink triggered CSI reporting for SPS in accordance with aspects of the present disclosure. The device 605 may be an example of aspects of a device 505, or a UE 115 as described herein. The device 605 may include a receiver 610, a UE communications manager 615, and a transmitter 640. The device 605 may also include a processor. Each of these components may be in communication with one another (e.g., via one or more buses).

The receiver 610 may receive information such as packets, user data, or control information associated with various information channels (e.g., control channels, data channels, and information related to downlink triggered CSI reporting for SPS, etc.). Information may be passed on to other components of the device 605. The receiver 610 may be an example of aspects of the transceiver 820 described with reference to FIG. 8. The receiver 610 may utilize a single antenna or a set of antennas.

The UE communications manager 615 may be an example of aspects of the UE communications manager 515 as described herein. The UE communications manager 615 may include an SPS configuration receiver 620, an activation DCI receiver 625, a channel state report configuration component 630, and a channel state report transmitter 635. The UE communications manager 615 may be an example of aspects of the UE communications manager 810 described herein.

The SPS configuration receiver 620 may receive, from a base station, an SPS configuration for the UE.

The activation DCI receiver 625 may receive, from the base station, DCI for activating the SPS configuration.

The channel state report configuration component 630 may determine, based on the DCI, the SPS configuration, or both, a channel state report configuration for the SPS configuration.

The channel state report transmitter 635 may transmit, to the base station and in accordance with the channel state report configuration, a channel state report for a downlink shared channel received according to the SPS configuration.

The transmitter 640 may transmit signals generated by other components of the device 605. In some examples, the transmitter 640 may be collocated with a receiver 610 in a transceiver module. For example, the transmitter 640 may be an example of aspects of the transceiver 820 described with reference to FIG. 8. The transmitter 640 may utilize a single antenna or a set of antennas.

Figure 7:
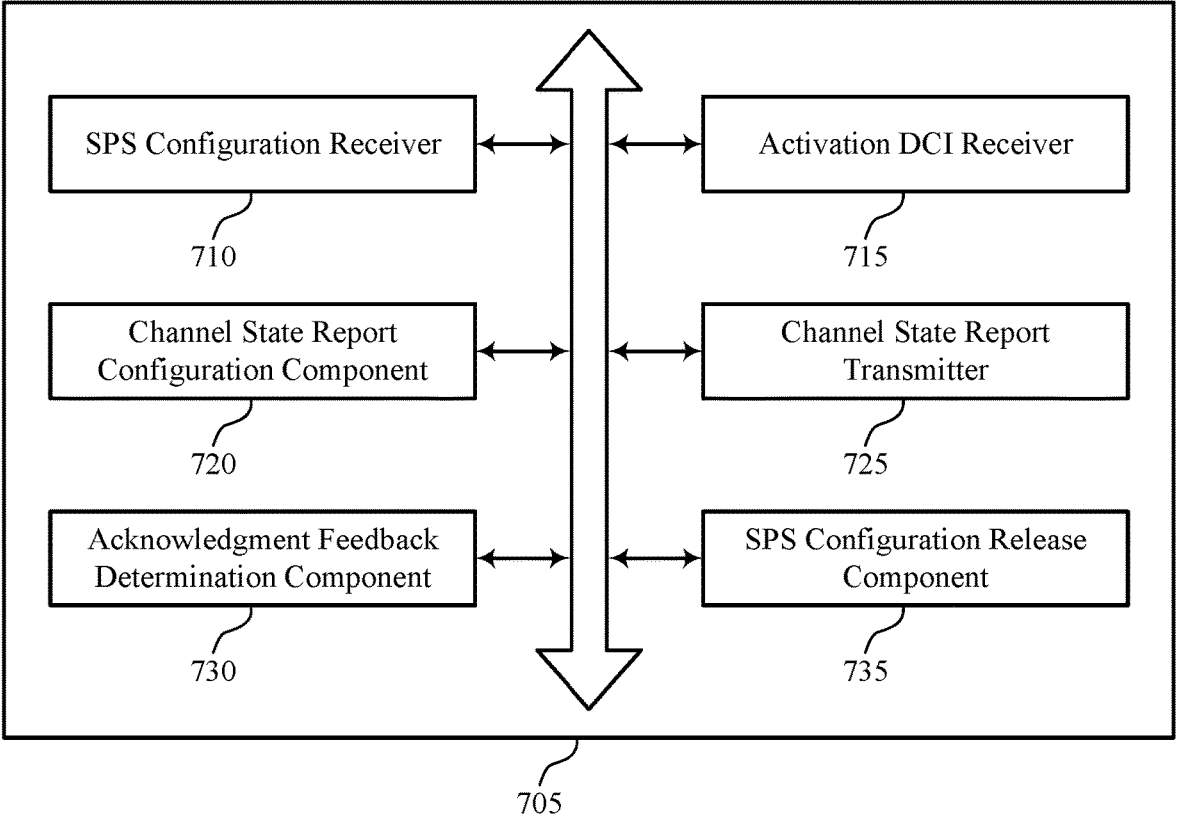
FIG. 7 shows a block diagram of a user equipment (UE) communications manager that supports downlink triggered CSI reporting for SPS in accordance with aspects of the present disclosure.

FIG. 7 shows a block diagram 700 of a UE communications manager 705 that supports downlink triggered CSI reporting for SPS in accordance with aspects of the present disclosure. The UE communications manager 705 may be an example of aspects of a UE communications manager 515, a UE communications manager 615, or a UE communications manager 810 described herein. The UE communications manager 705 may include an SPS configuration receiver 710, an activation DCI receiver 715, a channel state report configuration component 720, a channel state report transmitter 725, an acknowledgment feedback determination component 730, and an SPS configuration release component 735. Each of these modules may communicate, directly or indirectly, with one another (e.g., via one or more buses).

The SPS configuration receiver 710 may receive, from a base station, an SPS configuration for the UE. In some cases, the SPS configuration may include a set of configuration parameters of time resources, frequency resources, an MCS, or a combination thereof for the SPS configuration. Additionally, one or more SPS configurations may be configured for a single carrier of the UE.

The activation DCI receiver 715 may receive, from the base station, DCI for activating the SPS configuration. In some cases, the SPS configuration may include a set of SPS configurations, and the DCI may pertain to one or more of the set of SPS configurations.

The channel state report configuration component 720 may determine, based on the DCI, the SPS configuration, or both, a channel state report configuration for the SPS configuration.

In some examples, the channel state report configuration component 720 may identify that the SPS configuration includes an indication of one of a set of channel state report configurations and may determine that the channel state report configuration is the one of the set of channel state report configurations based on receipt of the DCI. In some cases, the channel state report and an acknowledgment feedback for the downlink shared channel may be transmitted together, regardless of whether the UE successfully decoded the downlink shared channel. Alternatively, the channel state report and the acknowledgment feedback for the downlink shared channel may be transmitted together when the UE fails to decode the downlink shared channel.

Additionally or alternatively, the channel state report configuration component 720 may identify that the DCI includes an indication of one of a set of channel state report configurations, where the channel state report configuration is the one of the set of channel state report configurations indicated by the DCI. In some cases, the indication in the DCI may include a bit field that activates a configured channel state report configuration included in the SPS configuration, where the SPS configuration includes one or more configured channel state report configurations. Additionally, the SPS configuration may include multiple SPS configurations, where the indication in the DCI includes a multi-bit field indicating respective channel state report configurations for each of the multiple SPS configurations.

The channel state report transmitter 725 may transmit, to the base station and in accordance with the channel state report configuration, a channel state report for a downlink shared channel received according to the SPS configuration.

The acknowledgment feedback determination component 730 may receive, from the base station, the downlink shared channel according to the SPS configuration, where the downlink shared channel is indicated by the DCI. In some examples, the acknowledgment feedback determination component 730 may determine acknowledgment feedback for the downlink shared channel, the acknowledgment feedback based on attempting to decode the downlink shared channel. Subsequently, the acknowledgment feedback determination component 730 may transmit, to the base station, the acknowledgment feedback for the downlink shared channel, where the acknowledgment feedback is transmitted with the channel state report.

The SPS configuration release component 735 may receive an additional DCI indicating that the SPS configuration is to be released, the additional DCI including a bit field for indication of the channel state report configuration. In some examples, the SPS configuration release component 735 may refrain from future transmission of the channel state report based on receipt of the additional DCI. In some cases, the bit field may include a predetermined value indicative of the release of the SPS configuration.

Figure 8:
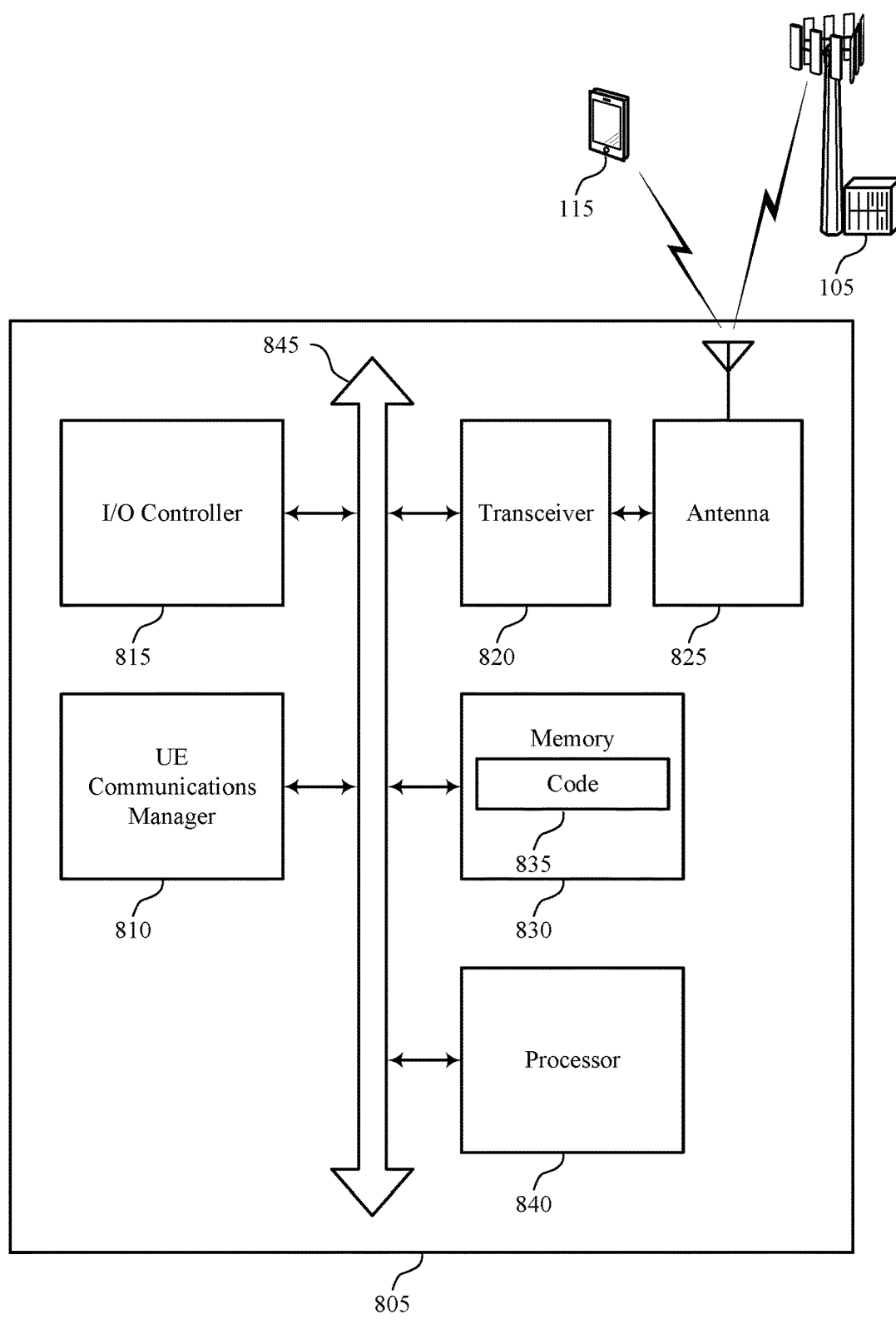
FIG. 8 shows a diagram of a system including a device that supports downlink triggered CSI reporting for SPS in accordance with aspects of the present disclosure.

FIG. 8 shows a diagram of a system 800 including a device 805 that supports downlink triggered CSI reporting for SPS in accordance with aspects of the present disclosure. The device 805 may be an example of or include the components of device 505, device 605, or a UE 115 as described herein. The device 805 may include components for bi-directional voice and data communications including components for transmitting and receiving communications, including a UE communications manager 810, an I/O controller 815, a transceiver 820, an antenna 825, memory 830, and a processor 840. These components may be in electronic communication via one or more buses (e.g., bus 845).

The UE communications manager 810 may receive, from a base station, an SPS configuration for the UE. Additionally, the UE communications manager 810 may receive, from the base station, DCI for activating the SPS configuration. In some cases, the UE communications manager 810 may determine, based on the DCI, the SPS configuration, or both, a channel state report configuration for the SPS configuration. Accordingly, the UE communications manager 810 may transmit, to the base station and in accordance with the channel state report configuration, a channel state report for a downlink shared channel received according to the SPS configuration.

The I/O controller 815 may manage input and output signals for the device 805. The I/O controller 815 may also manage peripherals not integrated into the device 805. In some cases, the I/O controller 815 may represent a physical connection or port to an external peripheral. In some cases, the I/O controller 815 may utilize an operating system such as iOS®, ANDROID®, MS-DOS®, MS-WINDOWS®, OS/2®, UNIX®, LINUX®, or another known operating system. In other cases, the I/O controller 815 may represent or interact with a modem, a keyboard, a mouse, a touchscreen, or a similar device. In some cases, the I/O controller 815 may be implemented as part of a processor. In some cases, a user may interact with the device 805 via the I/O controller 815 or via hardware components controlled by the I/O controller 815.

The transceiver 820 may communicate bi-directionally, via one or more antennas, wired, or wireless links as described above. For example, the transceiver 820 may represent a wireless transceiver and may communicate bi-directionally with another wireless transceiver. The transceiver 820 may also include a modem to modulate the packets and provide the modulated packets to the antennas for transmission, and to demodulate packets received from the antennas.

In some cases, the wireless device may include a single antenna 825. However, in some cases the device may have more than one antenna 825, which may be capable of concurrently transmitting or receiving multiple wireless transmissions.

The memory 830 may include random-access memory (RAM) and read-only memory (ROM). The memory 830 may store computer-readable, computer-executable code 835 including instructions that, when executed, cause the processor to perform various functions described herein. In some cases, the memory 830 may contain, among other things, a basic I/O system (BIOS) which may control basic hardware or software operation such as the interaction with peripheral components or devices.

The processor 840 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, the processor 840 may be configured to operate a memory array using a memory controller. In other cases, a memory controller may be integrated into the processor 840. The processor 840 may be configured to execute computer-readable instructions stored in a memory (e.g., the memory 830) to cause the device 805 to perform various functions (e.g., functions or tasks supporting downlink triggered CSI reporting for SPS).

The code 835 may include instructions to implement aspects of the present disclosure, including instructions to support wireless communications. The code 835 may be stored in a non-transitory computer-readable medium such as system memory or other type of memory. In some cases, the code 835 may not be directly executable by the processor 840 but may cause a computer (e.g., when compiled and executed) to perform functions described herein.

Figure 9:
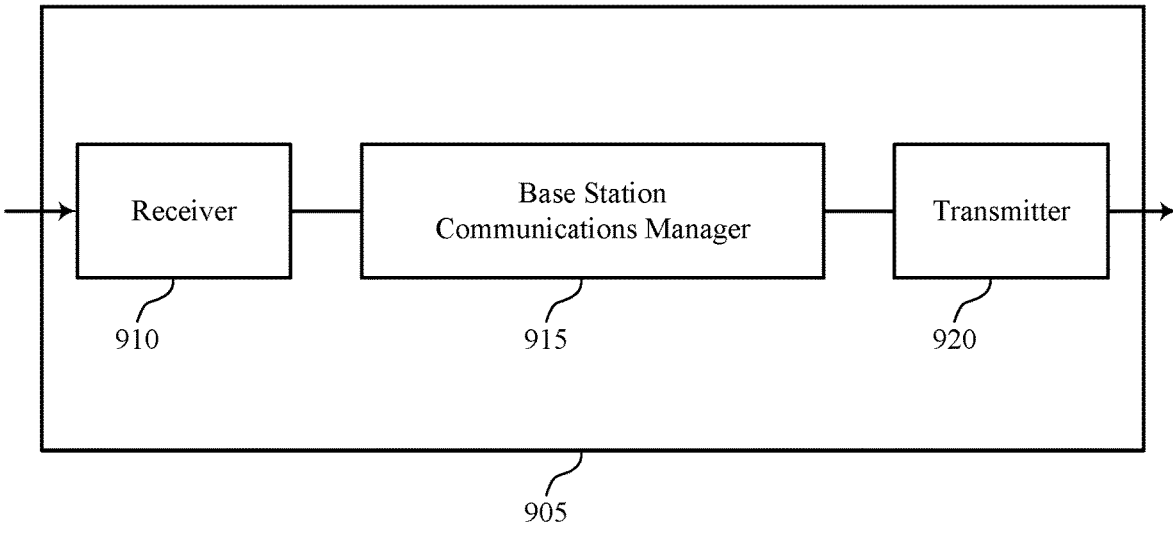
FIGS. 9 and 10 show block diagrams of devices that support downlink triggered CSI reporting for SPS in accordance with aspects of the present disclosure.

FIG. 9 shows a block diagram 900 of a device 905 that supports downlink triggered CSI reporting for SPS in accordance with aspects of the present disclosure. The device 905 may be an example of aspects of a base station 105 as described herein. The device 905 may include a receiver 910, a base station communications manager 915, and a transmitter 920. The device 905 may also include a processor. Each of these components may be in communication with one another (e.g., via one or more buses).

The receiver 910 may receive information such as packets, user data, or control information associated with various information channels (e.g., control channels, data channels, and information related to downlink triggered CSI reporting for SPS, etc.). Information may be passed on to other components of the device 905. The receiver 910 may be an example of aspects of the transceiver 1220 described with reference to FIG. 12. The receiver 910 may utilize a single antenna or a set of antennas.

The base station communications manager 915 may transmit, to a UE, an SPS configuration for communications with the UE. Additionally, the base station communications manager 915 may transmit, to the UE, DCI for activating the SPS configuration, where the DCI activates a channel state report configuration for the SPS configuration. In some cases, the base station communications manager 915 may receive, from the UE and in accordance with the channel state report configuration, a channel state report for a downlink shared channel received according to the SPS configuration. The base station communications manager 915 may be an example of aspects of the base station communications manager 1210 described herein.

The base station communications manager 915, or its sub-components, may be implemented in hardware, code (e.g., software or firmware) executed by a processor, or any combination thereof. If implemented in code executed by a processor, the functions of the base station communications manager 915, or its sub-components may be executed by a general-purpose processor, a DSP, an ASIC, an FPGA or other programmable logic device, discrete gate or transistor logic, discrete hardware components, or any combination thereof designed to perform the functions described in the present disclosure.

The base station communications manager 915, or its sub-components, may be physically located at various positions, including being distributed such that portions of functions are implemented at different physical locations by one or more physical components. In some examples, the base station communications manager 915, or its sub-components, may be a separate and distinct component in accordance with various aspects of the present disclosure. In some examples, the base station communications manager 915, or its sub-components, may be combined with one or more other hardware components, including but not limited to an I/O component, a transceiver, a network server, another computing device, one or more other components described in the present disclosure, or a combination thereof in accordance with various aspects of the present disclosure.

The transmitter 920 may transmit signals generated by other components of the device 905. In some examples, the transmitter 920 may be collocated with a receiver 910 in a transceiver module. For example, the transmitter 920 may be an example of aspects of the transceiver 1220 described with reference to FIG. 12. The transmitter 920 may utilize a single antenna or a set of antennas.

Figure 10:
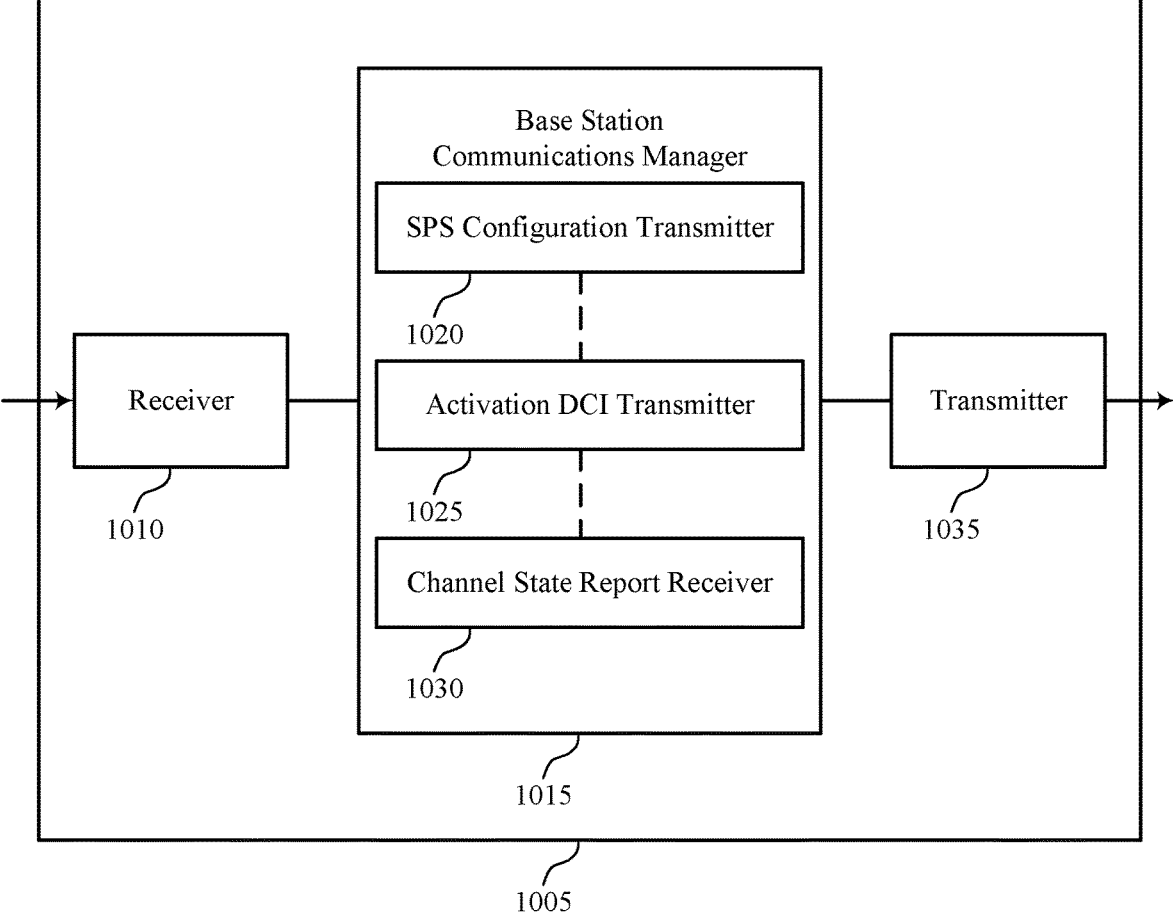

FIG. 10 shows a block diagram 1000 of a device 1005 that supports downlink triggered CSI reporting for SPS in accordance with aspects of the present disclosure. The device 1005 may be an example of aspects of a device 905, or a base station 105 as described herein. The device 1005 may include a receiver 1010, a base station communications manager 1015, and a transmitter 1035. The device 1005 may also include a processor. Each of these components may be in communication with one another (e.g., via one or more buses).

The receiver 1010 may receive information such as packets, user data, or control information associated with various information channels (e.g., control channels, data channels, and information related to downlink triggered CSI reporting for SPS, etc.). Information may be passed on to other components of the device 1005. The receiver 1010 may be an example of aspects of the transceiver 1220 described with reference to FIG. 12. The receiver 1010 may utilize a single antenna or a set of antennas.

The base station communications manager 1015 may be an example of aspects of the base station communications manager 915 as described herein. The base station communications manager 1015 may include an SPS configuration transmitter 1020, an activation DCI transmitter 1025, and a channel state report receiver 1030. The base station communications manager 1015 may be an example of aspects of the base station communications manager 1210 described herein.

The SPS configuration transmitter 1020 may transmit, to a UE, an SPS configuration for communications with the UE.

The activation DCI transmitter 1025 may transmit, to the UE, DCI for activating the SPS configuration, where the DCI activates a channel state report configuration for the SPS configuration.

The channel state report receiver 1030 may receive, from the UE and in accordance with the channel state report configuration, a channel state report for a downlink shared channel received according to the SPS configuration.

The transmitter 1035 may transmit signals generated by other components of the device 1005. In some examples, the transmitter 1035 may be collocated with a receiver 1010 in a transceiver module. For example, the transmitter 1035 may be an example of aspects of the transceiver 1220 described with reference to FIG. 12. The transmitter 1035 may utilize a single antenna or a set of antennas.

Figure 11:
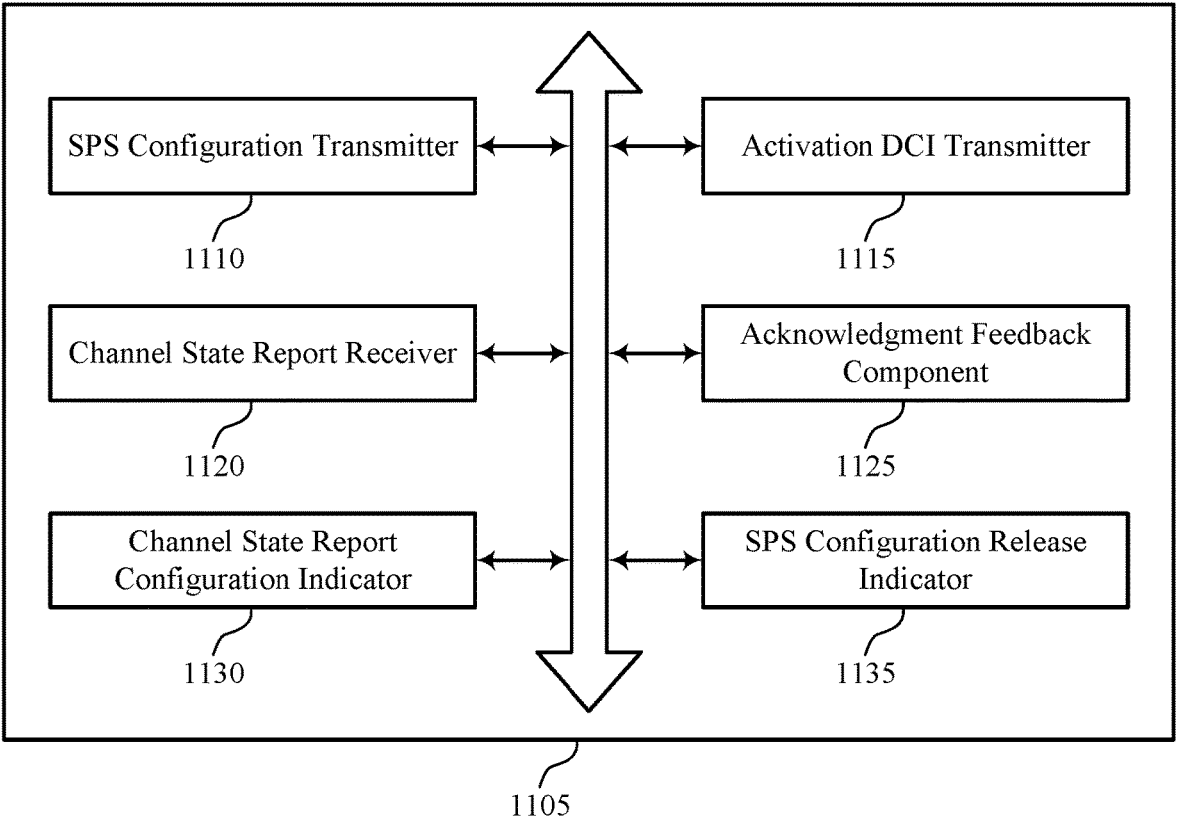
FIG. 11 shows a block diagram of a base station communications manager that supports downlink triggered CSI reporting for SPS in accordance with aspects of the present disclosure.

FIG. 11 shows a block diagram 1100 of a base station communications manager 1105 that supports downlink triggered CSI reporting for SPS in accordance with aspects of the present disclosure. The base station communications manager 1105 may be an example of aspects of a base station communications manager 915, a base station communications manager 1015, or a base station communications manager 1210 described herein. The base station communications manager 1105 may include an SPS configuration transmitter 1110, an activation DCI transmitter 1115, a channel state report receiver 1120, an acknowledgment feedback component 1125, a channel state report configuration indicator 1130, and an SPS configuration release indicator 1135. Each of these modules may communicate, directly or indirectly, with one another (e.g., via one or more buses).

The SPS configuration transmitter 1110 may transmit, to a UE, an SPS configuration for communications with the UE. In some cases, the SPS configuration may include a set of configuration parameters of time resources, frequency resources, an MCS, or a combination thereof for the SPS configuration. Additionally, one or more SPS configurations may be configured for a single carrier of the UE.

The activation DCI transmitter 1115 may transmit, to the UE, DCI for activating the SPS configuration, where the DCI activates a channel state report configuration for the SPS configuration. In some cases, the SPS configuration may include a set of SPS configurations, and the DCI may pertain to one or more of the set of SPS configurations.

The channel state report receiver 1120 may receive, from the UE and in accordance with the channel state report configuration, a channel state report for a downlink shared channel received according to the SPS configuration.

The acknowledgment feedback component 1125 may transmit, to the UE, the downlink shared channel according to the SPS configuration, where the downlink shared channel is indicated by the DCI. Subsequently, the acknowledgment feedback component 1125 may receive, from the UE, acknowledgment feedback for the downlink shared channel, where the acknowledgment feedback is received with the channel state report.

The channel state report configuration indicator 1130 may transmit, to the UE, an indication of one of a set of channel state report configurations with the SPS configuration, where the channel state report configuration is the one of the set of channel state report configurations. In some cases, the channel state report and an acknowledgment feedback for the downlink shared channel may be received together, regardless of whether the UE successfully decoded the downlink shared channel. Alternatively, the channel state report and the acknowledgment feedback for the downlink shared channel may be received together when the UE fails to decode the downlink shared channel.

Additionally or alternatively, the channel state report configuration indicator 1130 may transmit, to the UE, an indication of one of a set of channel state report configurations in the DCI, where the channel state report configuration is the one of the set of channel state report configurations indicated by the DCI. In some cases, the indication in the DCI may include a bit field that activates a configured channel state report configuration included in the SPS configuration, where the SPS configuration includes one or more configured channel state report configurations. Additionally, the SPS configuration may include multiple SPS configurations, where the indication in the DCI includes a multi-bit field indicating respective channel state report configurations for each of the multiple SPS configurations.

The SPS configuration release indicator 1135 may transmit, to the UE, an additional DCI indicating that the SPS configuration is to be released, the additional DCI including a bit field for indication of the channel state report configuration, where the channel state report is not received in a future transmission from the UE based on the additional DCI. In some cases, the bit field may include a predetermined value indicative of the release of the SPS configuration.

Figure 12:
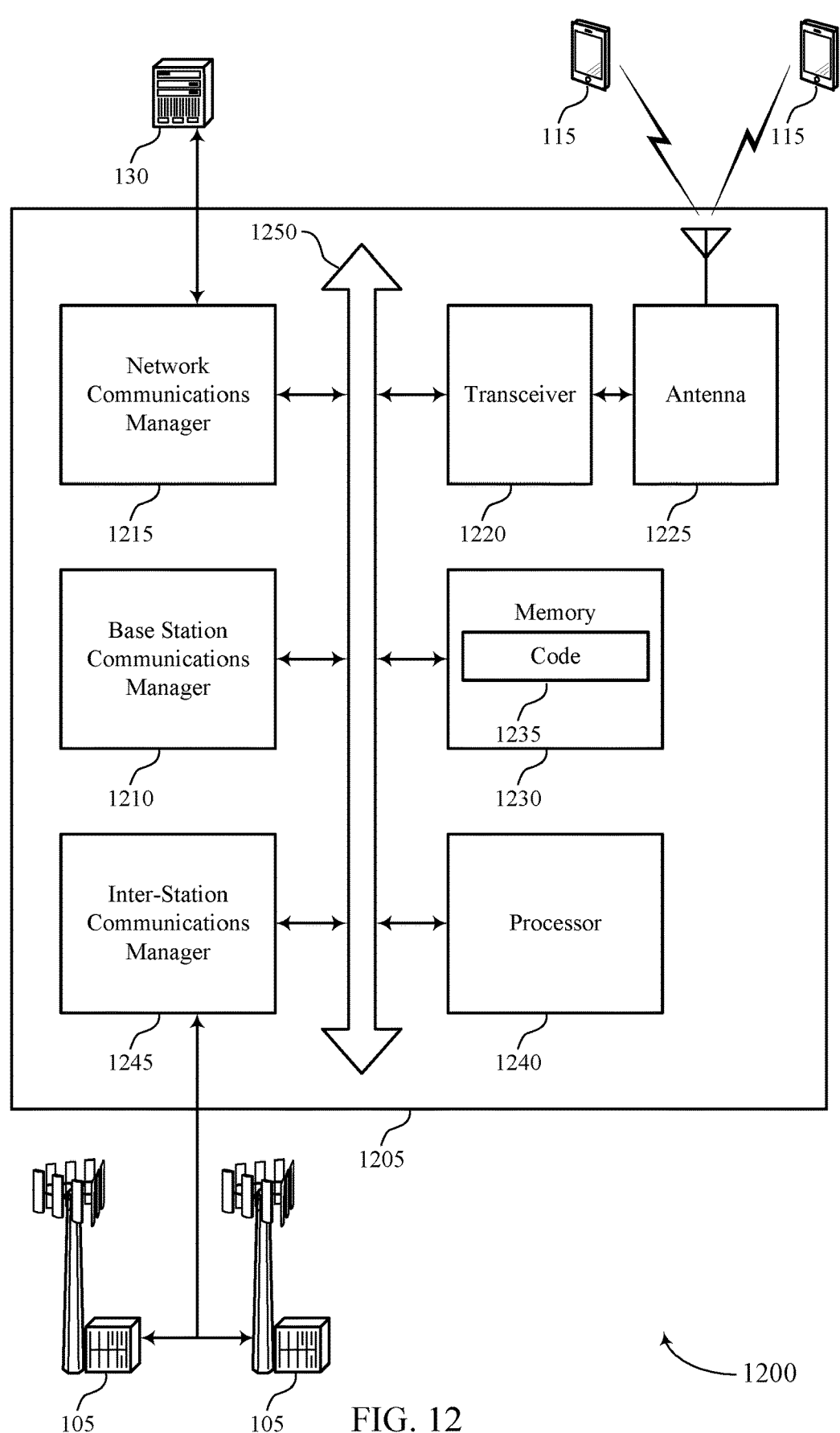
FIG. 12 shows a diagram of a system including a device that supports downlink triggered CSI reporting for SPS in accordance with aspects of the present disclosure.

FIG. 12 shows a diagram of a system 1200 including a device 1205 that supports downlink triggered CSI reporting for SPS in accordance with aspects of the present disclosure. The device 1205 may be an example of or include the components of device 905, device 1005, or a base station 105 as described herein. The device 1205 may include components for bi-directional voice and data communications including components for transmitting and receiving communications, including a base station communications manager 1210, a network communications manager 1215, a transceiver 1220, an antenna 1225, memory 1230, a processor 1240, and an inter-station communications manager 1245. These components may be in electronic communication via one or more buses (e.g., bus 1250).

The base station communications manager 1210 may transmit, to a UE, an SPS configuration for communications with the UE. Additionally, the base station communications manager 1210 may transmit, to the UE, DCI for activating the SPS configuration, where the DCI activates a channel state report configuration for the SPS configuration. In some cases, the base station communications manager 1210 may receive, from the UE and in accordance with the channel state report configuration, a channel state report for a downlink shared channel received according to the SPS configuration.

The network communications manager 1215 may manage communications with the core network (e.g., via one or more wired backhaul links). For example, the network communications manager 1215 may manage the transfer of data communications for client devices, such as one or more UEs 115.

The transceiver 1220 may communicate bi-directionally, via one or more antennas, wired, or wireless links as described above. For example, the transceiver 1220 may represent a wireless transceiver and may communicate bi-directionally with another wireless transceiver. The transceiver 1220 may also include a modem to modulate the packets and provide the modulated packets to the antennas for transmission, and to demodulate packets received from the antennas.

In some cases, the wireless device may include a single antenna 1225. However, in some cases the device may have more than one antenna 1225, which may be capable of concurrently transmitting or receiving multiple wireless transmissions.

The memory 1230 may include RAM, ROM, or a combination thereof. The memory 1230 may store computer-readable code 1235 including instructions that, when executed by a processor (e.g., the processor 1240) cause the device to perform various functions described herein. In some cases, the memory 1230 may contain, among other things, a BIOS which may control basic hardware or software operation such as the interaction with peripheral components or devices.

The processor 1240 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1240 may be configured to operate a memory array using a memory controller. In some cases, a memory controller may be integrated into processor 1240. The processor 1240 may be configured to execute computer-readable instructions stored in a memory (e.g., the memory 1230) to cause the device 1205 to perform various functions (e.g., functions or tasks supporting downlink triggered CSI reporting for SPS).

The inter-station communications manager 1245 may manage communications with other base station 105, and may include a controller or scheduler for controlling communications with UEs 115 in cooperation with other base stations 105. For example, the inter-station communications manager 1245 may coordinate scheduling for transmissions to UEs 115 for various interference mitigation techniques such as beamforming or joint transmission. In some examples, the inter-station communications manager 1245 may provide an X2 interface within an LTE/LTE-A wireless communication network technology to provide communication between base stations 105.

The code 1235 may include instructions to implement aspects of the present disclosure, including instructions to support wireless communications. The code 1235 may be stored in a non-transitory computer-readable medium such as system memory or other type of memory. In some cases, the code 1235 may not be directly executable by the processor 1240 but may cause a computer (e.g., when compiled and executed) to perform functions described herein.

Figure 13:
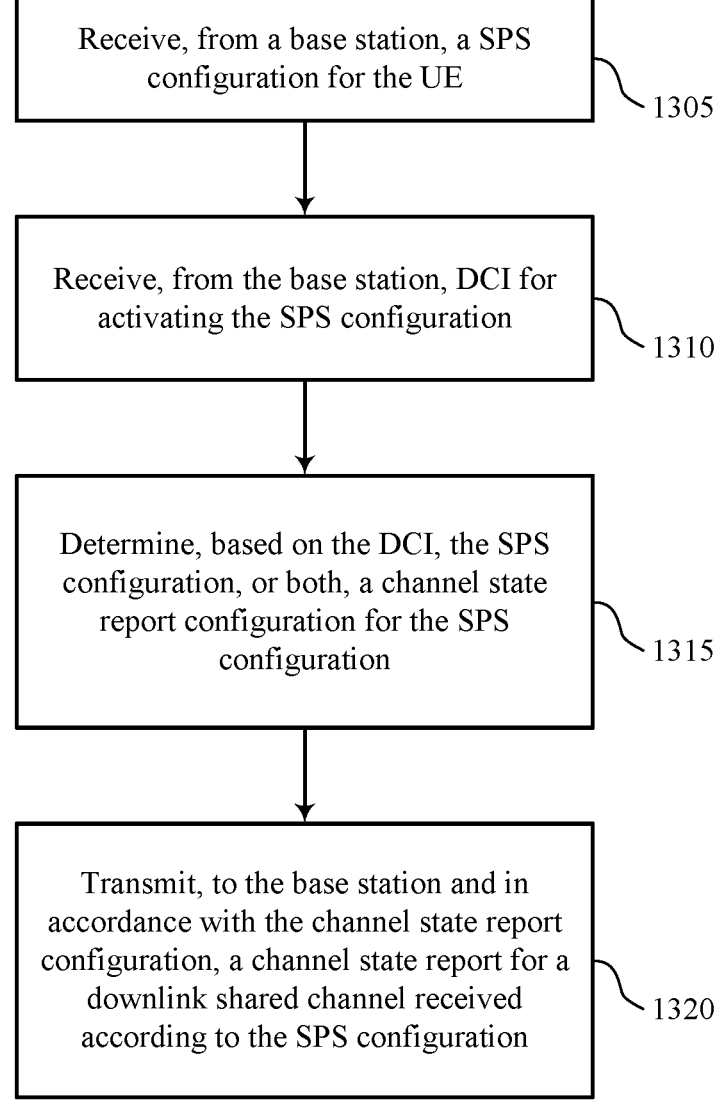

FIG. 13 shows a flowchart illustrating a method 1300 that supports downlink triggered CSI reporting for SPS in accordance with aspects of the present disclosure. The operations of method 1300 may be implemented by a UE 115 or its components as described herein. For example, the operations of method 1300 may be performed by a UE communications manager as described with reference to FIGS. 5 through 8. In some examples, a UE may execute a set of instructions to control the functional elements of the UE to perform the functions described below. Additionally or alternatively, a UE may perform aspects of the functions described below using special-purpose hardware.

At 1305, the UE may receive, from a base station, an SPS configuration for the UE. The operations of 1305 may be performed according to the methods described herein. In some examples, aspects of the operations of 1305 may be performed by an SPS configuration receiver as described with reference to FIGS. 5 through 8.

At 1310, the UE may receive, from the base station, DCI for activating the SPS configuration. The operations of 1310 may be performed according to the methods described herein. In some examples, aspects of the operations of 1310 may be performed by an activation DCI receiver as described with reference to FIGS. 5 through 8.

At 1315, the UE may determine, based on the DCI, the SPS configuration, or both, a channel state report configuration for the SPS configuration. The operations of 1315 may be performed according to the methods described herein. In some examples, aspects of the operations of 1315 may be performed by a channel state report configuration component as described with reference to FIGS. 5 through 8.

At 1320, the UE may transmit, to the base station and in accordance with the channel state report configuration, a channel state report for a downlink shared channel received according to the SPS configuration. The operations of 1320 may be performed according to the methods described herein. In some examples, aspects of the operations of 1320 may be performed by a channel state report transmitter as described with reference to FIGS. 5 through 8.

FIG. 14 shows a flowchart illustrating a method 1400 that supports downlink triggered CSI reporting for SPS in accordance with aspects of the present disclosure. The operations of method 1400 may be implemented by a UE 115 or its components as described herein. For example, the operations of method 1400 may be performed by a UE communications manager as described with reference to FIGS. 5 through 8. In some examples, a UE may execute a set of instructions to control the functional elements of the UE to perform the functions described below. Additionally or alternatively, a UE may perform aspects of the functions described below using special-purpose hardware.

At 1405, the UE may receive, from a base station, an SPS configuration for the UE. The operations of 1405 may be performed according to the methods described herein. In some examples, aspects of the operations of 1405 may be performed by an SPS configuration receiver as described with reference to FIGS. 5 through 8.

At 1410, the UE may receive, from the base station, DCI for activating the SPS configuration. The operations of 1410 may be performed according to the methods described herein. In some examples, aspects of the operations of 1410 may be performed by an activation DCI receiver as described with reference to FIGS. 5 through 8.

At 1415, the UE may determine, based on the DCI, the SPS configuration, or both, a channel state report configuration for the SPS configuration. The operations of 1415 may be performed according to the methods described herein. In some examples, aspects of the operations of 1415 may be performed by a channel state report configuration component as described with reference to FIGS. 5 through 8.

At 1420, the UE may identify that the SPS configuration includes an indication of one of a set of channel state report configurations. The operations of 1420 may be performed according to the methods described herein. In some examples, aspects of the operations of 1420 may be performed by a channel state report configuration component as described with reference to FIGS. 5 through 8.

At 1425, the UE may determine that the channel state report configuration is the one of the set of channel state report configurations based on receipt of the DCI. The operations of 1425 may be performed according to the methods described herein. In some examples, aspects of the operations of 1425 may be performed by a channel state report configuration component as described with reference to FIGS. 5 through 8.

At 1430, the UE may transmit, to the base station and in accordance with the channel state report configuration, a channel state report for a downlink shared channel received according to the SPS configuration. The operations of 1430 may be performed according to the methods described herein. In some examples, aspects of the operations of 1430 may be performed by a channel state report transmitter as described with reference to FIGS. 5 through 8.

FIG. 15 shows a flowchart illustrating a method 1500 that supports downlink triggered CSI reporting for SPS in accordance with aspects of the present disclosure. The operations of method 1500 may be implemented by a UE 115 or its components as described herein. For example, the operations of method 1500 may be performed by a UE communications manager as described with reference to FIGS. 5 through 8. In some examples, a UE may execute a set of instructions to control the functional elements of the UE to perform the functions described below. Additionally or alternatively, a UE may perform aspects of the functions described below using special-purpose hardware.

At 1505, the UE may receive, from a base station, an SPS configuration for the UE. The operations of 1505 may be performed according to the methods described herein. In some examples, aspects of the operations of 1505 may be performed by an SPS configuration receiver as described with reference to FIGS. 5 through 8.

At 1510, the UE may receive, from the base station, DCI for activating the SPS configuration. The operations of 1510 may be performed according to the methods described herein. In some examples, aspects of the operations of 1510 may be performed by an activation DCI receiver as described with reference to FIGS. 5 through 8.

At 1515, the UE may determine, based on the DCI, the SPS configuration, or both, a channel state report configuration for the SPS configuration. The operations of 1515 may be performed according to the methods described herein. In some examples, aspects of the operations of 1515 may be performed by a channel state report configuration component as described with reference to FIGS. 5 through 8.

At 1520, the UE may identify that the DCI includes an indication of one of a set of channel state report configurations, where the channel state report configuration is the one of the set of channel state report configurations indicated by the DCI. The operations of 1520 may be performed according to the methods described herein. In some examples, aspects of the operations of 1520 may be performed by a channel state report configuration component as described with reference to FIGS. 5 through 8.

At 1525, the UE may transmit, to the base station and in accordance with the channel state report configuration, a channel state report for a downlink shared channel received according to the SPS configuration. The operations of 1525 may be performed according to the methods described herein. In some examples, aspects of the operations of 1525 may be performed by a channel state report transmitter as described with reference to FIGS. 5 through 8.

FIG. 16 shows a flowchart illustrating a method 1600 that supports downlink triggered CSI reporting for SPS in accordance with aspects of the present disclosure. The operations of method 1600 may be implemented by a base station 105 or its components as described herein. For example, the operations of method 1600 may be performed by a base station communications manager as described with reference to FIGS. 9 through 12. In some examples, a base station may execute a set of instructions to control the functional elements of the base station to perform the functions described below. Additionally or alternatively, a base station may perform aspects of the functions described below using special-purpose hardware.

At 1605, the base station may transmit, to a UE, an SPS configuration for communications with the UE. The operations of 1605 may be performed according to the methods described herein. In some examples, aspects of the operations of 1605 may be performed by an SPS configuration transmitter as described with reference to FIGS. 9 through 12.

At 1610, the base station may transmit, to the UE, DCI for activating the SPS configuration, where the DCI activates a channel state report configuration for the SPS configuration. The operations of 1610 may be performed according to the methods described herein. In some examples, aspects of the operations of 1610 may be performed by an activation DCI transmitter as described with reference to FIGS. 9 through 12.

At 1615, the base station may receive, from the UE and in accordance with the channel state report configuration, a channel state report for a downlink shared channel received according to the SPS configuration. The operations of 1615 may be performed according to the methods described herein. In some examples, aspects of the operations of 1615 may be performed by a channel state report receiver as described with reference to FIGS. 9 through 12.

FIG. 17 shows a flowchart illustrating a method 1700 that supports downlink triggered CSI reporting for SPS in accordance with aspects of the present disclosure. The operations of method 1700 may be implemented by a base station 105 or its components as described herein. For example, the operations of method 1700 may be performed by a base station communications manager as described with reference to FIGS. 9 through 12. In some examples, a base station may execute a set of instructions to control the functional elements of the base station to perform the functions described below. Additionally or alternatively, a base station may perform aspects of the functions described below using special-purpose hardware.

At 1705, the base station may transmit, to a UE, an SPS configuration for communications with the UE. The operations of 1705 may be performed according to the methods described herein. In some examples, aspects of the operations of 1705 may be performed by an SPS configuration transmitter as described with reference to FIGS. 9 through 12.

At 1710, the base station may transmit, to the UE, DCI for activating the SPS configuration, where the DCI activates a channel state report configuration for the SPS configuration. The operations of 1710 may be performed according to the methods described herein. In some examples, aspects of the operations of 1710 may be performed by an activation DCI transmitter as described with reference to FIGS. 9 through 12.

At 1715, the base station may receive, from the UE and in accordance with the channel state report configuration, a channel state report for a downlink shared channel received according to the SPS configuration. The operations of 1715 may be performed according to the methods described herein. In some examples, aspects of the operations of 1715 may be performed by a channel state report receiver as described with reference to FIGS. 9 through 12.

At 1720, the base station may transmit, to the UE, an additional DCI indicating that the SPS configuration is to be released, the additional DCI including a bit field for indication of the channel state report configuration, where the channel state report is not received in a future transmission from the UE based on the additional DCI. The operations of 1720 may be performed according to the methods described herein. In some examples, aspects of the operations of 1720 may be performed by an SPS configuration release indicator as described with reference to FIGS. 9 through 12.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A user equipment (UE) for wireless communications, comprising:
  one or more memories storing processor-executable code; and
  one or more processors coupled with the one or more memories and operable to execute the code to cause the UE to:
    receive, from a network device, a semi-persistent scheduling configuration for the UE;
    receive, from the network device, downlink control information for activating the semi-persistent scheduling configuration;
    determine, based on the downlink control information, the semi-persistent scheduling configuration, or both, a channel state report configuration for the semi-persistent scheduling configuration, wherein, to determine the channel state report configuration for the semi-persistent scheduling configuration, the one or more processors are operable to execute the code are to cause the UE to:
      identify that the semi-persistent scheduling configuration includes an indication of one of a plurality of channel state report configurations; and
      determine that the channel state report configuration is the one of the plurality of channel state report configurations based at least in part on receipt of the downlink control information; and
    transmit, to the network device and in accordance with the channel state report configuration, a channel state report for a downlink shared channel received according to the semi-persistent scheduling configuration.

2. The UE of claim 1, wherein the one or more processors are further operable to execute the code to cause the UE to:
  receive, from the network device, the downlink shared channel according to the semi-persistent scheduling configuration, wherein the downlink shared channel is indicated by the downlink control information;

determine acknowledgment feedback for the downlink shared channel, the acknowledgment feedback based at least in part on attempting to decode the downlink shared channel; and
    transmit, to the network device, the acknowledgment feedback for the downlink shared channel, wherein the acknowledgment feedback is transmitted with the channel state report.

3. The UE of claim 1, wherein the channel state report and an acknowledgment feedback for the downlink shared channel are transmitted together, regardless of whether the UE successfully decoded the downlink shared channel.

4. The UE of claim 1, wherein the channel state report and an acknowledgment feedback for the downlink shared channel are transmitted together when the UE fails to decode the downlink shared channel.

5. The UE of claim 1, wherein, to determine the channel state report configuration for the semi-persistent scheduling configuration, the one or more processors are operable to execute the code are to cause the UE to:
  identify that the downlink control information includes an indication of one of a plurality of channel state report configurations, wherein the channel state report configuration is the one of the plurality of channel state report configurations indicated by the downlink control information.

6. The UE of claim 5, wherein the indication in the downlink control information comprises a bit field that activates a configured channel state report configuration included in the semi-persistent scheduling configuration, wherein the semi-persistent scheduling configuration includes one or more configured channel state report configurations.

7. The UE of claim 5, wherein the semi-persistent scheduling configuration comprises multiple semi-persistent scheduling configurations, and wherein the indication in the downlink control information comprises a multi-bit field indicating respective channel state report configurations for each of the multiple semi-persistent scheduling configurations.

8. The UE of claim 1, wherein the one or more processors are further operable to execute the code to cause the UE to:
  receive an additional downlink control information indicating that the semi-persistent scheduling configuration is to be released, the additional downlink control information including a bit field for indication of the channel state report configuration; and
  refrain from future transmission of the channel state report based at least in part on receipt of the additional downlink control information.

9. A network device for wireless communications, comprising:
  one or more memories storing processor-executable code; and
  one or more processors coupled with the one or more memories and operable to execute the code to cause the network device to:
    transmit, to a user equipment (UE), a semi-persistent scheduling configuration for communications with the UE;
    transmit, to the UE, an indication of one of a plurality of channel state report configurations with the semi-persistent scheduling configuration, wherein the channel state report configuration is the one of the plurality of channel state report configurations;
    transmit, to the UE, downlink control information for activating the semi-persistent scheduling configuration, wherein the downlink control information activates a channel state report configuration for the semi-persistent scheduling configuration; and receive, from the UE and in accordance with the channel state report configuration, a channel state report for a downlink shared channel received according to the semi-persistent scheduling configuration.

10. The network device of claim 9, wherein the one or more processors are further operable to execute the code to cause the network device to:

transmit, to the UE, the downlink shared channel according to the semi-persistent scheduling configuration, wherein the downlink shared channel is indicated by the downlink control information; and receive, from the UE, acknowledgment feedback for the downlink shared channel, wherein the acknowledgment feedback is received with the channel state report.

11. The network device of claim 9, wherein the channel state report and an acknowledgment feedback for the downlink shared channel are received together, regardless of whether the UE successfully decoded the downlink shared channel.

12. The network device of claim 9, wherein the channel state report and an acknowledgment feedback for the downlink shared channel are received together when the UE fails to decode the downlink shared channel.

13. The network device of claim 9, wherein the one or more processors are further operable to execute the code to cause the network device to:

transmit, to the UE, an indication of one of a plurality of channel state report configurations in the downlink control information, wherein the channel state report configuration is the one of the plurality of channel state report configurations indicated by the downlink control information.

14. The network device of claim 13, wherein the indication in the downlink control information comprises a bit field that activates a configured channel state report configuration included in the semi-persistent scheduling configuration, wherein the semi-persistent scheduling configuration includes one or more configured channel state report configurations.

15. The network device of claim 13, wherein the semi-persistent scheduling configuration comprises multiple semi-persistent scheduling configurations, and wherein the indication in the downlink control information comprises a multi-bit field indicating respective channel state report configurations for each of the multiple semi-persistent scheduling configurations.

16. The network device of claim 9, wherein the one or more processors are further operable to execute the code to cause the network device to:

transmit, to the UE, an additional downlink control information indicating that the semi-persistent scheduling configuration is to be released, the additional downlink control information including a bit field for indication of the channel state report configuration, wherein the channel state report is not received in a future transmission from the UE based at least in part on the additional downlink control information.

17. A method for wireless communications at a user equipment (UE), comprising:

receiving, from a network device, a semi-persistent scheduling configuration for the UE;

receiving, from the network device, downlink control information for activating the semi-persistent scheduling configuration;

determining, based on the downlink control information, the semi-persistent scheduling configuration, or both, a channel state report configuration for the semi-persistent scheduling configuration, wherein determining the channel state report configuration for the semi-persistent scheduling configuration comprises:

identifying that the semi-persistent scheduling configuration includes an indication of one of a plurality of channel state report configurations; and determining that the channel state report configuration is the one of the plurality of channel state report configurations based at least in part on receipt of the downlink control information; and transmitting, to the network device and in accordance with the channel state report configuration, a channel state report for a downlink shared channel received according to the semi-persistent scheduling configuration.

18. The method of claim 17, further comprising:

receiving, from the network device, the downlink shared channel according to the semi-persistent scheduling configuration, wherein the downlink shared channel is indicated by the downlink control information;

determining acknowledgment feedback for the downlink shared channel, the acknowledgment feedback based at least in part on attempting to decode the downlink shared channel; and transmitting, to the network device, the acknowledgment feedback for the downlink shared channel, wherein the acknowledgment feedback is transmitted with the channel state report.

19. The method of claim 17, wherein the channel state report and an acknowledgment feedback for the downlink shared channel are transmitted together, regardless of whether the UE successfully decoded the downlink shared channel.

20. The method of claim 17, wherein the channel state report and an acknowledgment feedback for the downlink shared channel are transmitted together when the UE fails to decode the downlink shared channel.

21. The method of claim 17, wherein determining the channel state report configuration for the semi-persistent scheduling configuration comprises:

identifying that the downlink control information includes an indication of one of a plurality of channel state report configurations, wherein the channel state report configuration is the one of the plurality of channel state report configurations indicated by the downlink control information.

22. The method of claim 21, wherein the indication in the downlink control information comprises a bit field that activates a configured channel state report configuration included in the semi-persistent scheduling configuration, wherein the semi-persistent scheduling configuration includes one or more configured channel state report configurations.

23. The method of claim 21, wherein the semi-persistent scheduling configuration comprises multiple semi-persistent scheduling configurations, and wherein the indication in the downlink control information comprises a multi-bit field indicating respective channel state report configurations for each of the multiple semi-persistent scheduling configurations.

24. The method of claim 17, further comprising:

receiving an additional downlink control information indicating that the semi-persistent scheduling configuration is to be released, the additional downlink control information including a bit field for indication of the channel state report configuration; and refraining from future transmission of the channel state report based at least in part on receipt of the additional downlink control information.

25. A method for wireless communications at a network device, comprising:

transmitting, to a user equipment (UE), a semi-persistent scheduling configuration for communications with the UE;

transmitting, to the UE, an indication of one of a plurality of channel state report configurations with the semi-persistent scheduling configuration, wherein the channel state report configuration is the one of the plurality of channel state report configurations;

transmitting, to the UE, downlink control information for activating the semi-persistent scheduling configuration, wherein the downlink control information activates a channel state report configuration for the semi-persistent scheduling configuration; and receiving, from the UE and in accordance with the channel state report configuration, a channel state report for a downlink shared channel received according to the semi-persistent scheduling configuration.

26. The method of claim 25, further comprising:

transmitting, to the UE, the downlink shared channel according to the semi-persistent scheduling configuration, wherein the downlink shared channel is indicated by the downlink control information; and receiving, from the UE, acknowledgment feedback for the downlink shared channel, wherein the acknowledgment feedback is received with the channel state report.

* * * * *